(12) United States Patent
Samuelson

(10) Patent No.: US 12,538,000 B2
(45) Date of Patent: *Jan. 27, 2026

(54) APPARATUS AND METHOD FOR PROVIDING AUDIO DESCRIPTION CONTENT

(71) Applicant: Roy F. Samuelson, Woodland Hills, CA (US)

(72) Inventor: Roy F. Samuelson, Woodland Hills, CA (US)

(73) Assignee: Parity Endeavors, Inc., Camarill, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 18/143,241

(22) Filed: May 4, 2023

(65) Prior Publication Data

US 2023/0276108 A1  Aug. 31, 2023

Related U.S. Application Data

(63) Continuation-in-part of application No. 17/195,721, filed on Mar. 9, 2021, now Pat. No. 11,683,567.

(60) Provisional application No. 62/986,935, filed on Mar. 9, 2020.

(51) Int. Cl.
*H04N 21/81* (2011.01)
*H04N 21/84* (2011.01)

(52) U.S. Cl.
CPC ..... *H04N 21/8106* (2013.01); *H04N 21/8146* (2013.01); *H04N 21/84* (2013.01)

(58) Field of Classification Search
CPC ............ H04N 21/8106; H04N 21/439; H04N 21/8146; H04N 21/84; G06F 16/686; H04R 5/04
See application file for complete search history.

(56) References Cited

U.S. PATENT DOCUMENTS

| | | | |
|---|---|---|---|
| 9,774,911 B1* | 9/2017 | Thomas | G10L 25/51 |
| 9,865,250 B1* | 1/2018 | Korn | G10L 13/08 |
| 2002/0089602 A1* | 7/2002 | Sullivan | H04N 21/23608 |
| | | | 375/E7.278 |
| 2009/0172028 A1 | 7/2009 | Benitez et al. | |
| 2012/0054796 A1* | 3/2012 | Gagnon | H04N 5/85 |
| | | | 725/40 |
| 2013/0107121 A1* | 5/2013 | Blanchard | G09B 21/006 |
| | | | 348/553 |

* cited by examiner

*Primary Examiner* — Fan S Tsang
(74) *Attorney, Agent, or Firm* — Michael A. Pugel

(57) ABSTRACT

A method and apparatus are described. The method includes receiving audio soundtracks including an audio soundtrack representing an audible form of written text and/or an audible description of a visual element, determining a quality level of that audio soundtrack, and modifying that audio soundtrack to include an indication of the quality level based on the determination. The apparatus includes a memory circuit that stores audio soundtracks including an audio soundtrack representing an audible form of written text and/or an audible description of a visual element. The apparatus further includes an audio processing circuit coupled to the memory circuit, the audio processing circuit configured to retrieve the set of audio soundtracks, determine a quality level of the audio soundtrack representing an audible form of written text, and modify that audio soundtrack to include an indication of the quality level based on the determination.

20 Claims, 14 Drawing Sheets

APPARATUS AND METHOD FOR PROVIDING AUDIO DESCRIPTION CONTENT

CROSS-REFERENCE TO RELATED APPLICATION

This application is a continuation-in-part of applicant's co-pending application Ser. No. 17/195,721, which claims the benefit, under 35 U.S.C. § 119(e), of U.S. Provisional Patent Application 62/986,935, filed on Mar. 9, 2020 which is incorporated herein in its entirety.

TECHNICAL FIELD

The present disclosure is generally related to processing and providing media content. More specifically, the present disclosure is related to generating, providing, and receiving an audio soundtrack representing an audible form of written text, an audible description of a visual element and/or an audible narration or description associated with visual content.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Audio description, previously referred to as video description or descriptive video, is a secondary audio file soundtrack to a movie, television show, or other various broadcast or streamed media containing narration describing the visual content of that media. As of the end of February, 2021, over 5100 unique titles of series and movies currently have audio description content tracks have been created and provided However, identification of the audio description content or soundtrack is limited to an a general identification entry by the streaming or network platform, or some other form of general indication of availability. Audiences who wish to utilize and experience audio description content as part of the media presentation are unable to identify which series or movies have audio description until they hear the audio description narration, which could be several minutes into the content, creating an accessibility barrier to enjoyment and immersion into the story. Further, some audience members listening may not understand what audio description is, how it works, and when it occurs and if it is not otherwise identified.

Others have tried more specific and timely identification methods, however most of these have proved either inaccessible or inconsistent. For example, on some network television stations, the audio description track has a randomly placed narrated phrase, such as "You are listening to video description on the secondary audio program channel . . . " While this identifies the presence and/or availability of audio description content, it also interrupts the immersion experience of the audience, in some cases both those wanting to use the audio description as well as those who do not. Further, the inserted phrase may disrupt other more necessary descriptions of the producer's visual intent. Another identification solution has been to include a visual logo, included in the program's landing page, at the beginning of the program, or placed in the video periodically. However, a visual logo will likely be inaccessible to many audience members who benefit most from the audio description content because they are blind or low vision.

None of the audio description identification methods, including those described above, have been universally used or accepted. Further, very few requirements for acceptable audio description content quality exist, either associated with the production of, or the delivery of, the audio description content within the framework of the media content. Depending on the delivery mechanism chosen by the content provider and/or distributor, the audio description content may be placed onto a separate audio content soundtrack that is intended to be mixed with the normal audio content soundtracks included for people also viewing the media. In other cases, the dedicated audio content is included into the normal audio content, either in original or modified form, as a single independent audio content soundtrack. As an example, terrestrial broadcast television delivery mechanisms may include the audio description soundtrack as one of several possibilities for content included through the separate secondary audio program (SAP) soundtracks in the broadcast audio multiplex of television signal.

Content (e.g., television, movie, or streaming) producers may also employ several possible mechanisms for generating the audio description content including, but not limited to, professional human scripted and generated scene and context description content, computer generated scene and context description content, and human scripted but computer generated scene and context description content. These mechanisms have both differing costs associated with them as well as a potential disparate quality level associated with them. Often, the decisions related to the quality of the audio description face significant compromises as a result of media production values and decisions. However, a user or audience member who wishes to utilize the audio description track as part of experiencing the media content is not made aware of the quality level of the audio description soundtrack, thus potentially affecting the enjoyment and experience of the user.

Many of the mechanisms for generating audio description content, and the corresponding decisions related to quality, also apply to audio soundtracks that are generated independent of visual content, such as audiobooks, as well as audio soundtracks that support visual content, such as audio descriptions of images or picture books. Unlike an audio description track, these audio soundtracks may be generated based on words in a book or written text for the image or picture book and may contain dialog or narration in addition to a description of a scene. In other words, this audio soundtrack represents the spoken expression of words typically expressed in writing. Likewise, a user or audience member utilizing these audio soundtracks is not currently made aware of the quality level of the audio description soundtrack, similarly affecting the enjoyment and experience of the user, including those users that are blind or low vision.

As a result, there is a need to provide an identification mechanism for the quality level of the audio soundtracks that are generated to support written or scripted text and provided to users or audience members, including those who are blind or low vision. provide Further, there is a need for establishing and utilizing one or more tiers of quality associated with production and/or delivery of these audio soundtracks delivered as part of the media content package, such as an audiobook or a podcast, to the consumer and audience that is relatively unobtrusive to the overall audience experience. Still further, there is a need for an identification mechanism that indicates a minimum level of quality to users for these audio soundtracks and, in some instances, provides an indication of the tier of quality that has been used in the production and/or delivery of these audio soundtracks. One or more of the present embodiments attempt to address one or more of these needs.

SUMMARY

These and other drawbacks and disadvantages presented by content distribution systems in electronic devices are addressed by the principles of the present disclosure, which are directed to a content distribution device used in a multichannel distribution system. However, it can be understood by those skilled in the art that the present principles may offer advantages in other content distribution systems in other devices as well.

According to an implementation a method is described. The method includes receiving at least one audio soundtrack associated with media content, the at least audio soundtrack including an audio soundtrack representing at least one of an audible form of written text and an audible description of a visual element, determining a quality level of the audio soundtrack representing at least one of an audible form of written text and an audible description of a visual element, and modifying the audio soundtrack representing at least one of an audible form of written text and an audible description of a visual element to include an indication of the quality level based on the determination.

According to an implementation, an apparatus is described. The apparatus includes a memory circuit that stores at least one audio soundtrack associated with media content, the at least audio soundtrack including an audio soundtrack representing at least one of an audible form of written text and an audible description of a visual element. The apparatus further includes an audio processing circuit coupled to the memory circuit, the audio processing circuit configured to retrieve the set of audio soundtracks and determine a quality level of the audio soundtrack representing at least one of an audible form of written text and an audible description of a visual element, the audio processing circuit further configured to modify the audio soundtrack representing at least one of an audible form of written text and an audible description of a visual element to include an indication of the quality level based on the determination.

According to an implementation, a computer readable medium is described. The computer readable medium includes instructions in the form of program code that, when executed on one or more processors, receives at least audio soundtrack associated with media content, the at least audio soundtrack including an audio soundtrack representing at least one of an audible form of written text and an audible description of a visual element, determines a quality level of the audio soundtrack, and modifies the audio soundtrack to include an indication of the quality level based on the determination.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
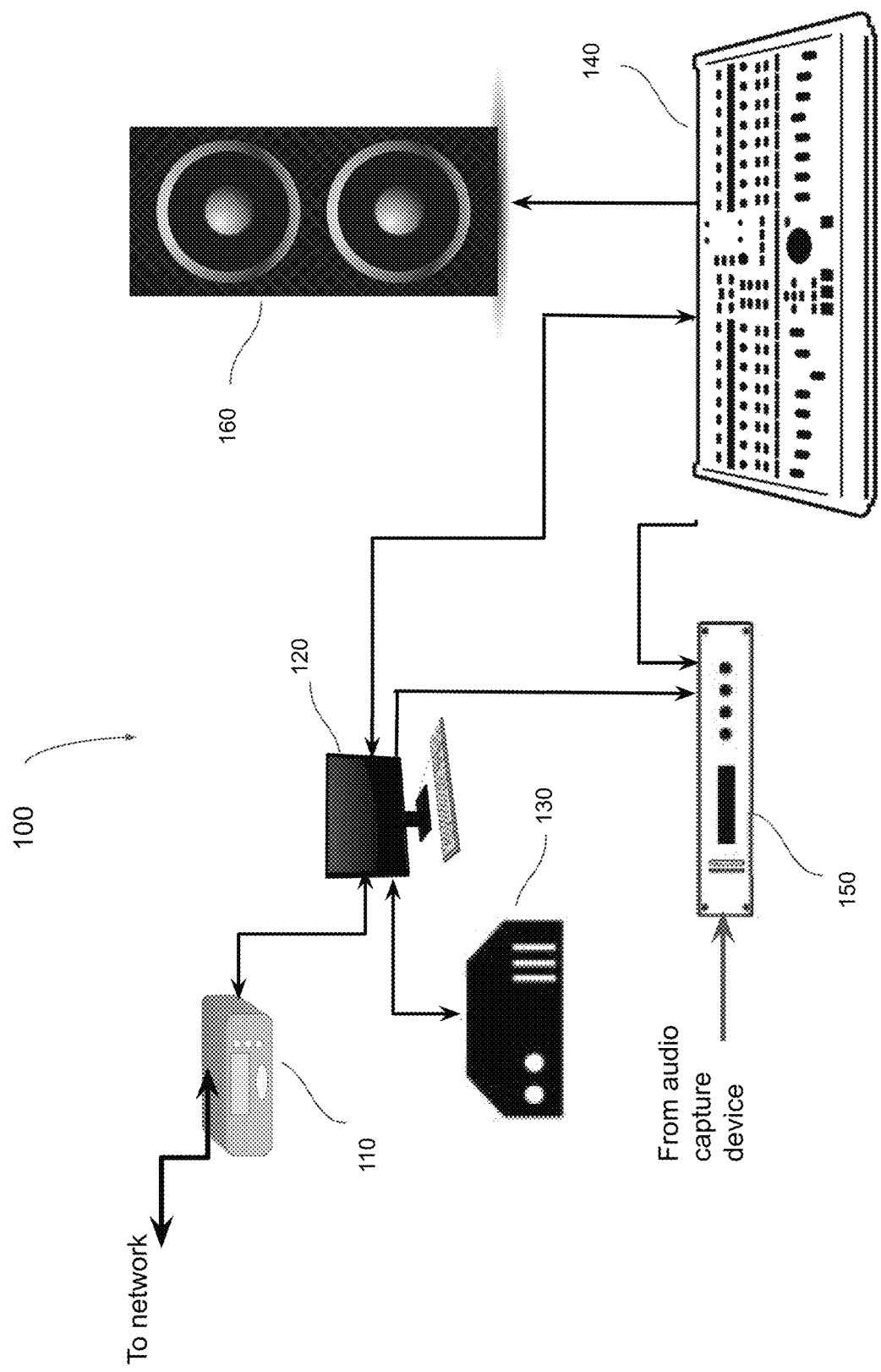
FIG. 1 is a diagram of an exemplary post-production system to which principles of the present disclosure are applicable.

It should be understood that the elements shown in the figures may be implemented in various forms of hardware, software, or combinations thereof. Preferably, these elements are implemented in a combination of hardware and software on one or more appropriately programmed general-purpose devices, which may include a processor, memory, and input/output interfaces. Herein, the phrase "coupled" is defined to mean directly connected to or indirectly connected with one or more intermediate components. Such intermediate components may include both hardware and software-based components.

The present description illustrates the principles of the present disclosure. It will thus be appreciated that those skilled in the art will be able to devise various arrangements which, although not explicitly described or shown herein, embody the principles of the disclosure and are included within its spirit and scope.

All examples and conditional language recited herein are intended for educational purposes to aid the reader in understanding the principles of the disclosure and the concepts contributed by the inventor to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor", "module" or "controller" should not be construed to refer exclusively to hardware capable of executing software, and may implicitly include, without limitation, a System on a Chip (SoC), digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the embodiments hereof, any element expressed or described, directly or indirectly, as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present embodiments address issues associated with identifying the quality level, of an audio soundtrack, such as audio soundtracks representing an audible form of written text and/or an audible description of a visual element and audio description soundtracks, that may be included in a set of audio soundtracks associated with specific media content. Often media content containing both audio and video either does not have an audio description soundtrack generated during production or post-production or the media content distributor chooses not to provide the audio description soundtrack with the media content package. Further even if such audio soundtracks are provided, the quality of these audio soundtracks may not be made to a minimum or even consistent level of production quality. As a result, users, including blind and low vision users, may be disappointed with their user experience while listening to the audio content.

The present embodiments describe a mechanism to insert an identifier or an indicator of a quality level for the audio content into the audio soundtrack as part of their listening experience. The identifier or indicator ideally should be something that will be easily recognized by users, including those users who are blind or low vision. In some embodiments, the identifier or indicator may be additional audio content that is inserted in, or accompanies, the audio soundtracks associated with the entire package of media content. For example, the additional audio content may be inserted, and subsequently played back, at the beginning of the playback of the audio soundtrack associated with the media content or media presentation (e.g., before the intended audio content begins). In some cases the identifier or indicator may be controlled and used by content producers and/or content distributors only if the audio soundtrack representing an audible form of written text and/or an audible description of a visual element, complies with a level of established quality based on requirements for the needs of the users.

In some embodiments, the audio content may include a sound or series of tones that is short in length and inserted as a separate track on top of the beginning of the audio description content or track. The sound or series of tones may be specific notes or frequencies, such as the a frequency associated with an A note in the musical scale (e.g., a power of two multiple of 27.50 hertz (Hz)) followed by a D note in the musical scale (e.g., a power of two multiple of 18.35 Hz). In some embodiments, the notes may be monoharmonic (e.g., computer generated) while in other embodiments the notes may be polyharmonic (e.g., orchestra generated). The use of the notes A and D is an abbreviation of the words audio description, and may be easily recognizable to some users, such as blind and low vision users. The term audio description is more commonly known in the movie and entertainment industry but is also applicable to other forms of audio playback including, but not limited to, audiobooks, podcasts, and radio programs, and descriptions of visual elements in a museum. In some embodiments, different harmonic constructs may be used to indicate different quality levels for the audio description content. By placing the identifier or indicator at key time points within the media content, such as specifically before the intended audio content begins, and further making the audio content easily recognizable, audiences would be able to correctly identify the level of quality present in the audio soundtrack. By identifying the level of quality, users better know what to expect from the audio content they are listening to and/or know what they are about to hear meets at least a minimum level of performance and standard of quality.

One or more of the embodiments of the present disclosure may be used with any type of media presentation content including, but not limited to, entertainment content (e.g., motion picture, television, broadcast, or streaming content), corporate video content (e.g., corporate marketing, education, informational, or advertising content), privately generated content, educational content (e.g., course lecture content or conference lecture content), and social media content. One or more embodiments of the present disclosure may also be applicable to other forms of media, such as audio centric media including, but not limited to, audio podcasts, radio programs, and audible versions of books, magazines, and newspapers, as well as audio complemented visual media including, but not limited to audible descriptions of pictures, paintings, photographs, sculptures, picture books, and comic books.

FIG. 1 illustrates a diagram of an exemplary post-production system 100 according to principles of the present embodiments. The post-production system 100 may be used in a variety of production settings associated with the generation and distribution of media content. In particular, post-production system 100 may be well suited for use in a production setting that will generate, process, and manage one or more audio soundtracks, including an audio soundtrack used for audio description. In post-production system 100, a media content package is received through secure network device 110. The secure network device 110 is coupled to media content processing device 120. Media content processing device is coupled to storage device 130 as well as audio content processing device 140. Audio content processing device 140 is coupled to digital audio interface device 150 as well as audio reproduction device 160. It is worth noting that some elements or components that may be necessary for proper operation of a post-production system are not shown or described here for the sake of conciseness as they are well known to those skilled in the art.

The secure network device 110 provides an interface to media content servers located remotely from the facility housing the post-production system 100. These media content servers are securely managed and maintained by one or more media content producers and/or media content distributors. Examples of media content producers include, but are not limited to, Warner Brothers Entertainment, Universal Pictures, and Walt Disney Studios. Examples of media content distributors include, but are not limited to, Comcast, AT&T, and Hulu. In some embodiments, the media content producers may include written content or physical media content producers, such as book, magazine, or newspaper publishers, or even private companies or individual web-based written content producers. Further, in some embodiments, the media content distributors may include web based internet distributors or large retail businesses. The secure network device 110 allows the post-production system 100 to receive media content from media content producers for post-production processing. The media content may be in the form of a package that contains various media content files or content streams. The files or streams may be further grouped into audio, video, and/or data files or streams. The media content may be received through a private or secure public network connection such as a wide area network (WAN) or the internet. The media content may also be received through a secure private local network such as an Ethernet network or local area network (LAN).

The media content or package received by the secure network device 110 is provided to the media content processing device 120 over a local data network connection such as Ethernet. The media content processing device 120 may perform media content stream or file parsing or separating as well as routing of portions of the media content to various other elements in post-production system 100 for additional processing. For instance, the media content processing device 120 may separate the audio soundtracks in the media content package from the remaining portions in order to facilitate separate audio processing. In some embodiments, the media content package may include only audio soundtracks. The media content processing device 120 may also control the routing of portions of media content, such as audio soundtracks, to and from storage device 130. The media content processing device 120 may also control the routing of one or more audio soundtracks, along with user generated or software generated control commands, to the audio content processing device 140 and digital audio interface device 150. The media content processing device 120 may interface with the storage device 130 as well as the audio content processing device 140 and digital audio interface device 150 using an inter-device connection, such as universal serial bus (USB), and/or may interface through a local network connection, such as ethernet.

The media content processing device 120 may further combine or package the portions or elements of the parsed and processed media content, including any newly generated and/or modified audio soundtracks processed in the audio content processing device 140, to form one or more content streams that may be provided back to the secure network device 110. The secure network device 110 may provide or deliver the one or more content streams over the secure network to the media content servers described above or may deliver the one or more content streams directly to the media content distributors for delivery over a media content distribution network. Examples of media content distribution networks include, but are not limited to, over the air broadcast network, satellite network, cable network, and cellular wireless network. These distribution networks may use a specialized delivery mechanism and protocol format or may use internet protocol format. The media content processing device 120 further includes some form of user interface including, but not limited to, a display screen, a keyboard, a mouse, and the like. It is worth noting that the media content processing device 120 may take on various forms with embodiments including, but not limited to, a desktop computer, a laptop computer, a smart terminal, a server device, a dedicated processing box, and the like.

The storage device 130 stores program instructions and/or software code to be executed by the media content processing device 120 as part of its operation. The storage device 130 may also store program instruction and/or software code similarly used by the audio content processing device 140, and/or the digital audio interface device 150. The storage device 130 may also store all or portions of media content, such as audio soundtracks that are being processed and/or modified along with any metadata associated with the audio soundtracks. The storage device 130 may include any suitable storage components or elements capable of storing the programming code, data, or the like in a computer-readable manner. Examples of elements used as part of storage device 130 include non-transitory computer-readable storage media such as semiconductor memory devices, and magnetic, optical, or magneto-optical recording media loaded into a read and write unit. The semiconductor memory devices may include but are not limited to, RAM, ROM, Electrically-Erasable Programmable ROM (EEPROM), and flash memory.

The audio content processing device 140 provides signal processing for the audio portion of the media content including, but not limited to any audio streams or audio soundtracks included in the media content. The signal processing elements in audio content processing device 140 may include audio stream or soundtrack identification and separation. The separation process may be necessary depending on the format of the audio content or soundtracks. For instance, in some digital file formats, the audio data from various soundtracks may be multiplexed in one file and may need to be separated in order to accommodate separate processing. The signal processing elements may further include modification of each of the separated audio streams or soundtracks as well as identifying and generating relationships between them. The processing performed on each of the separated audio streams may include linear and non-linear signal level modification, frequency response adjustments and enhancements, and two dimensional or three dimensional spatial positioning of the sound with respect to locations associated with any video portion of the media content. The processing may further include combining or mixing two of more of the audio streams or soundtracks to generate a new soundtrack. Further, the functionality of any or all of these processing elements may be extended to any audio signal that is locally generated and input to the audio content processing device 140 through the digital audio interface device 150.

Control of the processing elements may be managed and controlled by a user (e.g., a production or audio engineer) directly through a user interface on the audio content processing device 140. Control may also be highly automated and managed based on program code entered directly on the audio content processing device 140 or through a user interface on the media content processing device 120 with control commands passed over an inter-device or local network connection as described above. The audio content processing device may take on many forms, with embodiments including but not limited to, a laptop computer, a desktop computer, a mainframe computer with user interface console, an audio workstation, a sound mixing board, and the like.

The digital audio interface device 150 provides an interface to the audio content processing device 140 that facilitates capturing locally generated audio content, such as a human generated scene and context description used as an audio description soundtrack and other spoken or musical sound content, such as from instruments used in a musical performance. The digital audio interface device 150 may receive sound content in an analog signal format from an audio capture device, such as a microphone, a guitar, a keyboard, or an analog sound processing device. The analog signal is provided through an analog audio signal connection and converted by the digital audio interface device 150 into a suitable digital audio signal for processing in the audio content processing device 140. The digital audio interface device 150 may be configured to connect to the audio content processing device 140 through one or more digital audio interfaces including, but not limited to audio engineering society (AES) 3, multi-channel audio digital interface (MADI), Sony/Philips digital interface (S/PDIF), and the like.

The audio reproduction device 160 receives audio content and provides a sound output in order for a user (e.g., the audio or production engineer) to confirm or verify proper operation and/or performance of the audio sound content and/or audio soundtracks that will be included in the media content package. In other words, the audio reproduction device 160 allows the user to hear the audio that is being or has been processed to confirm no issues with the audio content are present. Examples of an audio reproduction device 160 include, but are not limited to, audio headphones and one or more audio speakers. In some embodiments, the audio reproduction device 160 may receive a digital audio signal representing the audio content, convert the digital audio signal to an analog signal, and amplify it before providing it as a sound output.

It is worth noting that while audio content processing device 140 and digital audio interface device 150 are described as operating primarily on digital audio content streams, other embodiments may include and/or primarily use analog audio signal processing devices to perform the same or similar tasks as described above. Examples of such equipment include, but are not limited to, analog or digital audio tape machines, analog mixing boards and signal processing devices, master audio tape machines, magnetic film stripe machines, optical film processing machines, and the like.

In operation, the post-production system 100 receives or accesses media content, such as a media content package, through secure network device 110. The media content package will include a set of one or more audio soundtracks. The set of soundtracks may include main audio soundtracks for general public consumption as well as auxiliary audio soundtracks, which may contain specialized audio content for specific users. For example, the auxiliary audio soundtracks may include an audio description soundtrack for specific use by users who are blind or low vision. The media content package may also include one or more video content stream tracks along with data or metadata. The data or metadata may either be embedded within the streams or soundtracks or aggregated in a separate stream or track. The media content package is provided to the media content processing device 120 from the secure media server 110. In some embodiments, all or a portion of the media content package may be stored in storage device 130. The media content processing device 120 may further identify and separate portions of the media content package, including a portion containing the set of audio soundtracks and may place this portion in storage device 130. The audio content processing device 140 may receive the set of audio soundtracks through media content processing device 120, either upon receipt by the secure media device 110 through media content processing device or following retrieval from storage device 130. The receipt of the set of audio soundtracks may be a result of a control command created by a user (e.g., production or audio engineer) that requests the soundtracks. The receipt may otherwise be a result of an automated or software generated control command upon creation of the portion of the media content containing the audio soundtracks.

In some embodiments, the main audio soundtracks may include an audio soundtrack representing an audible form of written text, such as is used in generating an audiobook from a written book or an audible version of a magazine or newspaper. Additionally, in some embodiments, the main audio soundtracks may include an audio soundtrack representing an audible form of a description of one or more visual images, such as a picture, a photograph, a painting, a sculpture, or visual images in a picture book. Further, the audio soundtrack may represent an audible form of both written text and description of visual images as well as additional narration, such as in a comic book or as part of a podcast. These audio soundtracks are different from the audio description soundtracks described herein in that an audio description soundtrack includes only scene and context description in support of other audible content present in other audio soundtracks. In other words, an audio description soundtrack only includes part of the story, while the audio soundtracks representing an audible form of written text and/or a description of visual images are responsible for telling the entire story.

In some embodiments, the audio content processing device 140 may determine if one of the audio soundtracks in the set of received or retrieved audio soundtracks is an audio description soundtrack associated with the media content. The determination may be performed by identifying the relationship of the content of one or more of the soundtracks to other soundtracks in the set of audio soundtracks. Audio content in an audio description soundtrack, often referred to as the scene and context description for the video content, is often only present or more prevalent during times of little or no audio content in any of the main audio soundtracks associated with the media content. Such a condition makes it possible to determine a specific relationship using several techniques, including signal processing techniques used in audio content processing device 140, between an audio description soundtrack and the main audio soundtracks.

If it is determined that one of the soundtracks from the set of audio soundtracks supplied with the media content is an audio description soundtrack, the audio processing device 140 modifies one or more of the main audio soundtracks associated with the media content to include an indicator that an audio description soundtrack is available for the media content one of the audio soundtracks in the set of audio soundtracks is an audio description soundtrack. The audio description soundtrack may also be modified to include the indicator. The indicator may include a sound or tone, a simple spoken word, or any other embodiment that may be easily recognized by those users who are blind or low vision.

In some embodiments, audio content processing device 140 may additionally or alternatively modify the main audio soundtrack and/or the audio description soundtrack to include an indicator of the quality level of the audio description soundtrack. Additionally, in some embodiments, the audio processing device 140 may further combine or mix the modified main audio soundtrack with the audio description soundtrack to produce a modified audio description soundtrack. Further, in some embodiments, the media content processing device 120 packages the set of audio soundtracks, including any modified audio soundtracks, such as the main audio soundtracks and/or the audio description soundtrack, back with the other portions of the media content package delivery back through secure network server 110 to either the content producer or the content distributor as described above.

In other embodiments, audio content processing device 140 may additionally or alternatively modify an audio soundtrack representing an audible form of written text and/or an audible description of visual elements to include an indicator of the quality level of the audio soundtrack as part of a set of audio soundtracks. Additionally, in some embodiments, the audio processing device 140 may further combine or mix the modified audio soundtrack with the other audio soundtracks. Further, in some embodiments, the media content processing device 120 packages the set of audio soundtracks, including modified audio soundtrack, back with any other portions of the media content package delivery back through secure network server 110 to either the content producer or the content distributor as described above. The operation of devices as well as the techniques used for generating and providing audio soundtracks as well as determining and providing an indication of quality of an audio soundtrack representing an audible form of written text and/or an audible description of visual elements will be described in further detail below.

Figure 2:
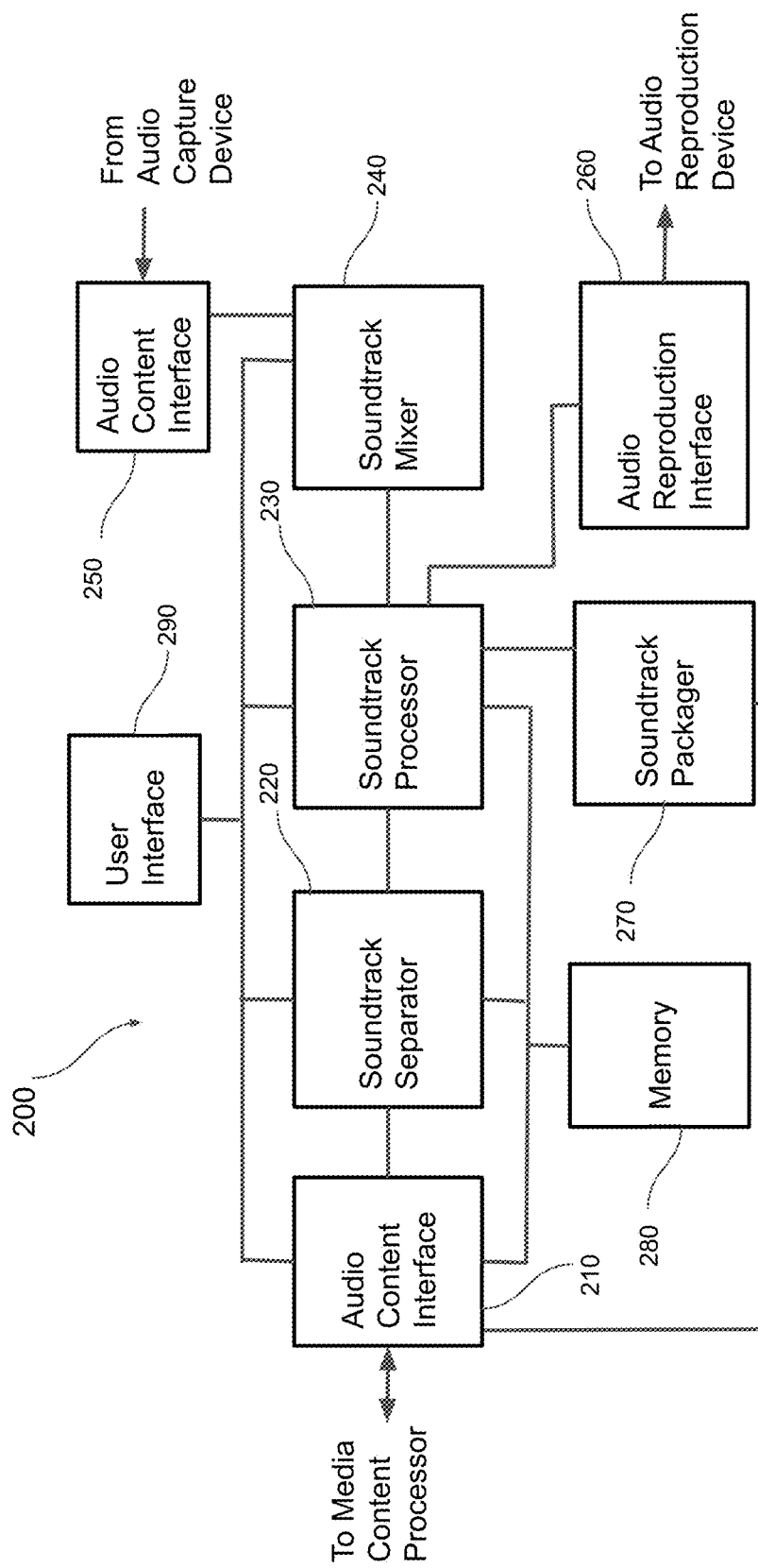
FIG. 2 is a block diagram of an exemplary audio workstation to which principles of the present disclosure are applicable.

FIG. 2 shows a block diagram of an exemplary audio workstation 200 according to aspects of the present embodiments. Audio workstation 200 may operate in a manner similar to audio content processing device 140 described in FIG. 1. Audio workstation 200 may also include additional audio processing control mechanisms and audio content management capabilities along with content storage capabilities similar to those that may be found in media content processing device 120 and storage device 130. In audio workstation 200, audio content, including one or more audio soundtracks, from a media content device (e.g., media content processor 120 in FIG. 1) or storage unit (e.g., storage device 130) at post-production facility (e.g., post-production facility 100) is provided to audio content interface 210. Audio content interface 210 is coupled to soundtrack separator 220. Soundtrack separator 220 is coupled to soundtrack processor 230. Soundtrack processor 230 is coupled to soundtrack mixer 240. Locally generated audio content from an audio capture device may be provided to audio content interface 250. Audio content interface 250 is coupled to soundtrack mixer 240. Soundtrack processor 230 is also coupled to audio reproduction interface 260. Audio reproduction interface 260 provides an audio signal to an audio reproduction device. Soundtrack processor 230 is also coupled to soundtrack packager 270. Memory 280 is coupled to audio content interface 210, soundtrack separator 220 and soundtrack processor 230. User interface 290 is coupled to audio content interface 210, soundtrack separator 220, soundtrack processor 230, and soundtrack mixer 240. Soundtrack packager 270 is also coupled to audio content interface 210 in order to provide the processed audio content that includes the one or more modified audio soundtracks back to a media device or storage unit at the post-production facility. It is worth noting that some elements or components that may be necessary for proper operation of audio workstation 200 are not shown or described here for the sake of conciseness as they are well known to those skilled in the art.

The audio content interface 210 provides the communication connection between the audio workstation 200 and other media content processing and control or storage devices (e.g., media content processing device 120 or storage unit 130 in FIG. 1). The audio content stream received through audio content interface 210 is analyzed, identified, and parsed into separate audio soundtracks using the soundtrack separator 220. Each of the separate audio soundtracks generally contains timing and synchronization information for managing synchronization between a set of audio soundtracks. In some embodiments, a synchronization track may be additionally or alternatively included with the soundtracks in the audio content stream.

The separated audio soundtracks may be individually processed in soundtrack processor 230. The soundtrack processor 230 applies individual sound processing elements or circuitry to each soundtrack. The processing may include, but is not limited to, signal level adjustment, frequency response adjustment, and spatial position adjustment as described above. The processing may also include audio content analysis such as identification analysis associated with audio description soundtracks as well some elements of audio description quality analysis. In the event that two or more soundtracks are to be combined, the soundtracks are mixed to form a new soundtrack in soundtrack mixer 240 and the new soundtrack provided back to soundtrack processor 230. Additionally, locally generated audio content, including scene and content description content used to generate an audio description soundtrack or content representing written text and/or a description of visual elements, may be provided to the soundtrack mixer 240 through audio content interface 250.

Once all audio processing on the soundtracks is complete, the soundtracks, including any new or modified soundtracks, are repackaged into an audio stream in soundtrack packager 270. After repackaging, the audio content stream is provided from to audio content interface 210 for use by other media content processing and control devices (e.g., media content processing device 120 in FIG. 1).

Memory 280 may be used to store any intermediate soundtrack data or audio content during processing as well as any software instructions or signal processing scripts used as part of automating content analysis as well as modifications on the soundtracks. Memory 280 may also store particular settings for various processing elements within audio workstation 200.

The audio reproduction interface 260 receives audio content or data from one or more audio soundtracks. The audio reproduction interface 260 may provide the audio content to one or more sound reproduction devices (e.g., audio reproduction device 160 described in FIG. 1) through an appropriate analog or digital interface connection. Examples of interface connections include, but are not limited to, a 3.5 millimeter audio jack, a ¼ inch audio jack, a S/PDIF connector, and the like.

User interface 290 interface receives inputs from the user (e.g., production or audio engineer) associated with specific actions or controls implemented as part of the processing in audio workstation 200. The user interface 290 may include adjustment knobs, levers, and switches laid out in a grid pattern to control individual soundtracks. The user interface 290 may further include a display screen to show visual indications of audio soundtrack signals or control setting for the processing. The user interface 290 may further include a keyboard, a mouse, a joystick, or similar interactive controls associated with a display screen.

Control of the processing elements may be managed and controlled by a user (e.g., production or audio engineer) directly through the user interface 290. Control may also be highly automated and managed based on program code or scripts entered directly on the audio workstation 200 or through the user interface on a different device, such as the media content processing device 120 in FIG. 1, with control commands passed over an inter-device or local network connection as described above.

It is worth noting that each of the elements in audio workstation 200 may be implemented in dedicated electronic circuitry, application specific circuitry, or programmable digital circuit arrays. In some embodiments, the audio soundtrack separator 220, soundtrack processor 230, soundtrack mixer 240, and soundtrack packager 270 may be implemented using a specifically programmed embedded microcontroller or processor or a general purpose microprocessor or computer running dedicated audio processing software stored in memory 280. In one embodiment, audio workstation 200 includes a computing device that runs an audio processing software package, such as Pro Tools®.

The audio workstation 200, including some combination of audio hardware and/or audio software, can be used and programmed to manage the production and modification of the audio content received through audio content interface 210. Audio content files, as well as video content reference files from the media content, may be processed to generate and evaluate audio description soundtracks. Further, the hardware (e.g., soundtrack processor 230) and/or software package in audio workstation 200 may identify and determine the availability and/or quality of an audio description soundtrack based on soundtrack content analysis or metadata processing as described above. Based on the availability and/or quality of an audio description soundtrack, the hardware and/or software package in workstation 200 may modify one or more audio soundtracks in the provided set of soundtracks associated with the media content to include an indicator that audio description content (e.g., a soundtrack) is available for the media content. The indicator may be additional metadata added to one or more of the audio soundtracks or added to a data file that is associated with the media content. In some embodiments, the indicator may be an audible sound. The audible sound is itself a soundtrack file that is stored in memory 280 and added to or inserted into one or more of the soundtracks. For example, the audible sound may be a short audio passage less than three seconds in length and composed of one or more tones having a frequency of an A note combined in some manner with one or more tones having a frequency of a D note. It is noted that one or more pitches of tones used for either the A note (e.g., a power of two multiple of 27.50 Hz) or the D note (e.g., a power of two multiple of 18.35 Hz) may be used simultaneously.

In some embodiments, the hardware (e.g., soundtrack processor 230) and/or software package in audio workstation 200 may identify and determine the quality of an audio soundtrack that represents or includes an audible form of written text and/or an audible description of a visual element and may further modify this audio soundtrack and/or one or more other audio soundtracks in the provided set of soundtracks in a manner similar to that described above.

Figure 3:
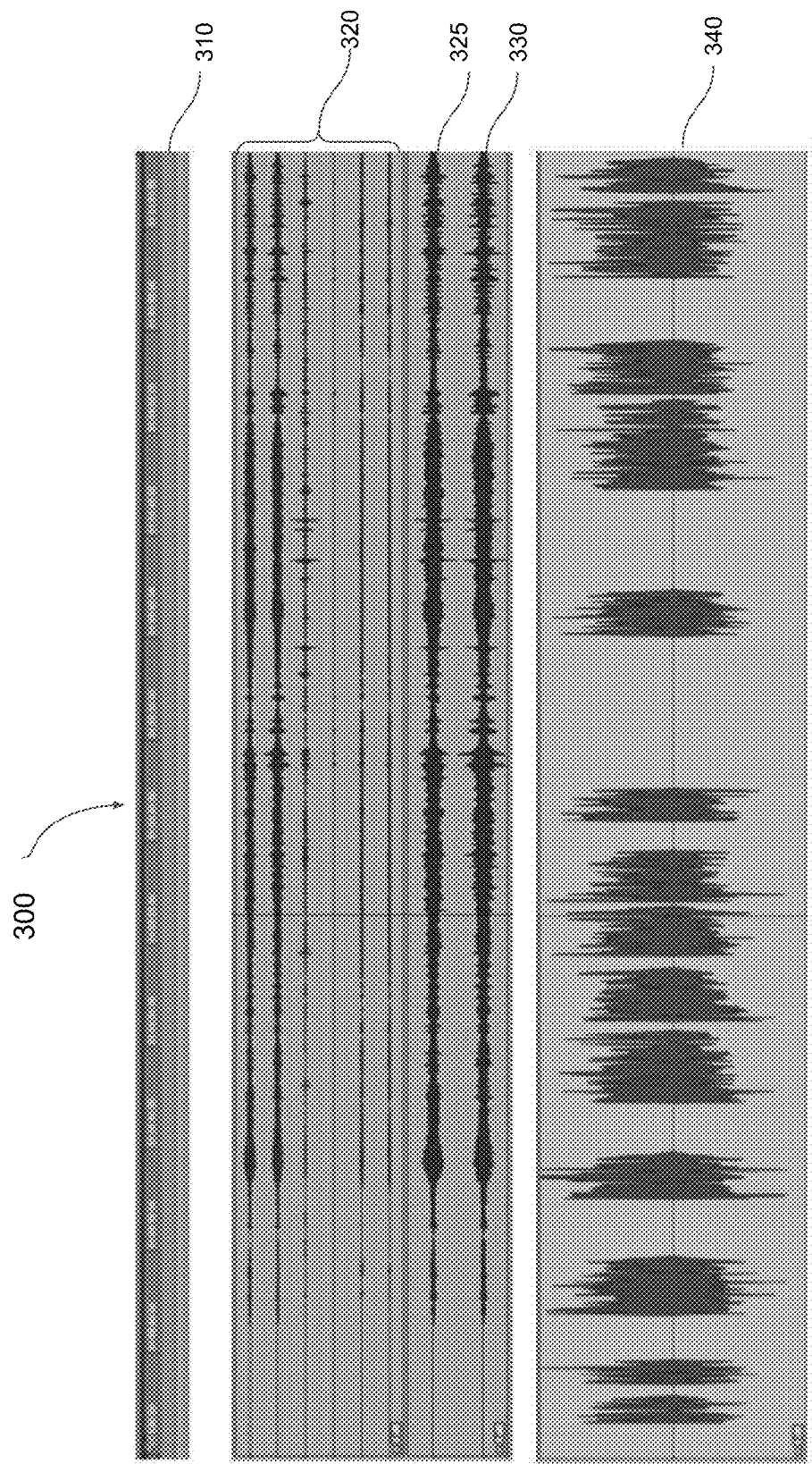
FIG. 3 is an exemplary user interface including a display of signal waveforms for a set of audio soundtracks associated with media content to which principles of the present disclosure are applicable.

FIG. 3 shows an exemplary user interface 300 including a display of signal waveforms for a set of audio soundtracks associated with media content according to aspects of the present disclosure. The user interface 300 may be generated using program instructions as part of an audio processing software package, such as Pro Tools®. The software package may be used in, or included as part of, an audio content processing device, such as audio workstation 200 described in FIG. 2 or audio content processing device described in FIG. 2. The user interface 300 may be displayed on a display incorporated into a user interface, such as user interface 290 in FIG. 2, or may be displayed on a separate display device (e.g., a tablet computer, a laptop computer) through a display or network connection from the audio content processing device. The user interface 300 may be used in conjunction with content manipulation controls included in one or more menus accessible by a user (e.g., production or audio engineer) through a user interface (e.g., user interface 290 in FIG. 2). The menus may include selection entries for ingesting data, representing one or more of the set of audio soundtracks, into the software as well as separating and displaying signal waveforms, as part of user interface 300, representing one or more of the soundtracks. The menus may also include selection entries for processing and mixing one or more of the set of the audio soundtracks as well as repackaging the processed set of audio soundtracks for use with a media content package as described above.

The user interface 300 includes a top horizontal axis representing a time axis 310. The time axis 310 may be scalable under user control to display the signal waveform for an entire soundtrack or set of soundtracks, or only a portion. Although not shown, a vertical axis may also be included to represent signal level or amplitude for the displayed signal waveforms. In some embodiments, movable coordinate markers for each signal waveform may also be included to display the amplitude of one or more signal waveforms at a particular time position along the time axis 310. As shown, user interface 300 is displaying the signal waveforms representing the initial portion of a set of audio soundtracks covering approximately one minute in length.

The user interface 300 also displays a set of signal waveforms 320 representing a portion of audio soundtracks that are included as main audio soundtracks associated with a media content package. As described above, the main audio soundtracks are the audio soundtracks that would normally be provided for sound reproduction to all of the users or patrons during presentation of the media content at a presentation facility or during reception and display on a user device. The set of signal waveforms 320 displayed on user interface 300 include a set of six signal waveforms representing the audio soundtracks used for audio reproduction according to a 5.1 surround sound format. The user interface 300 further displays signal waveform 325 and signal waveform 330 representing left and right stereo audio soundtracks also included as main audio soundtracks associated with the media content package. The user interface 300 may display more or fewer signal waveforms representing main audio soundtracks depending on requirements and preferences of the user (e.g., production or audio engineer). Additionally, other and/or different audio soundtracks may be included as part of the set of main audio soundtracks. Information regarding additional audio soundtrack structures and formats will be described in detail below.

User interface 300 also displays a signal waveform 340. Signal waveform 340 represents an audio description soundtrack that includes the content scene and context description associated with the video portion of the media content. The audio description soundtrack may be provided as part of the media content package as described above, or may be generated, either locally or remotely, and ingested into the software package through the audio content processing device (e.g., audio workstation 200 in FIG. 2) separate from the media content package. The audio description soundtrack containing the scene and context description may be generated based on a script that is put together under one or both of human generation and computer generation and control. An audio signal for the audio description soundtrack may be generated using one or both of a recorded human voice or computer synthesis. Signal waveform 340 may be identified as an audio description soundtrack associated with the media content package based on waveform content analysis using an analysis script created within the software package (e.g., Pro Tools®) or may be identified using metadata or other similar data provided electronically or physically with the audio description soundtrack. The identification of the audio description soundtrack as part of user interface 300 may be included as part of determining the availability of an audio description soundtrack, as described above.

Figure 4:
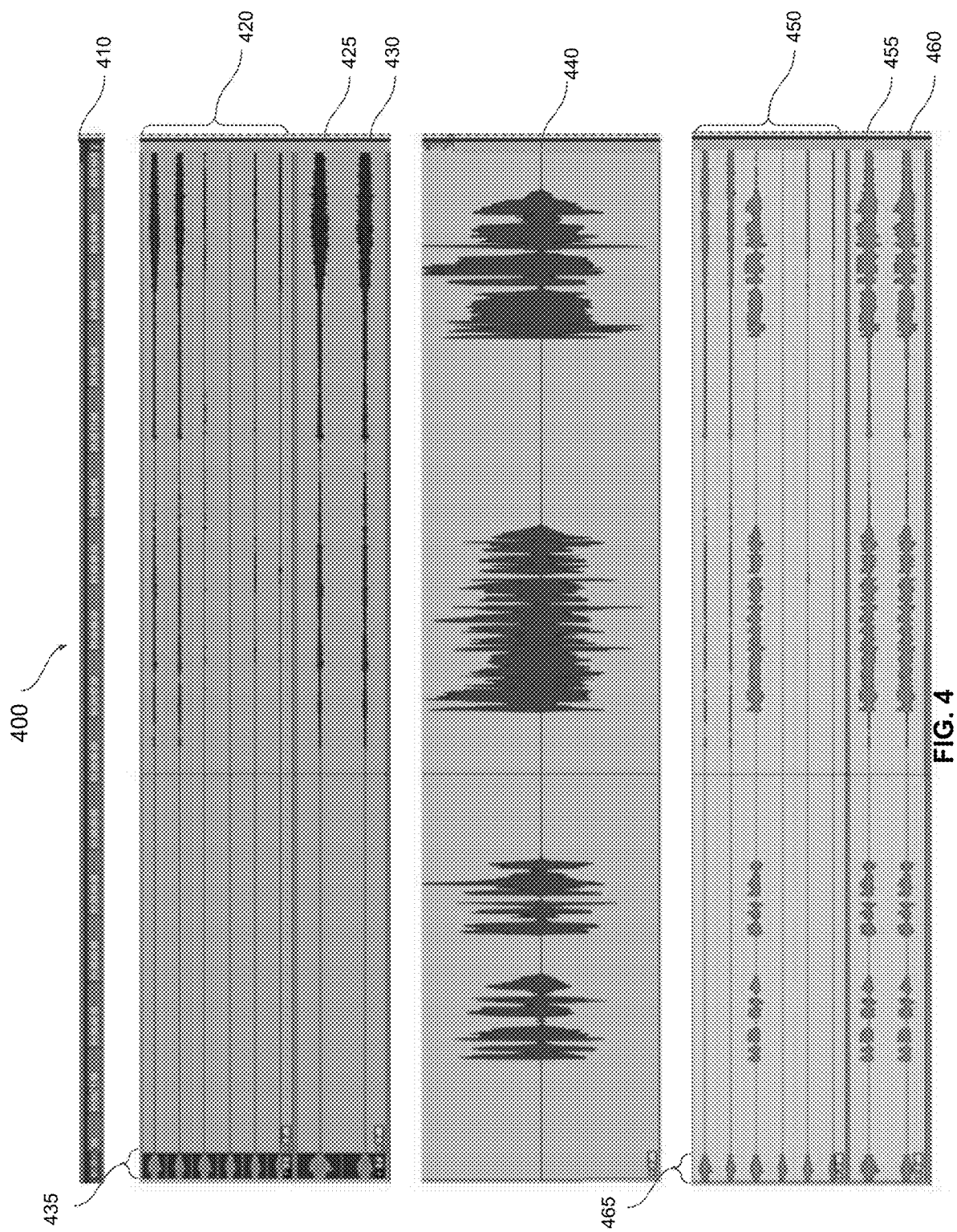
FIG. 4 is another exemplary user interface including a display of signal waveforms for a set of audio soundtracks associated with media content to which principles of the present disclosure are applicable.

FIG. 4 shows another exemplary user interface 400 including a display of waveform signals for a set of audio soundtracks associated with media content according to aspects of the present disclosure. The user interface 400 may be generated and used in the same manner as described for user interface 300 in FIG. 3. Further, except as described here in FIG. 4, the operation and display of elements 410, 420, 425, 430, and 440 will be the same as described for elements 310, 320, 325, 330, and 340 for user interface 300.

In user interface 400, time axis 410 has been adjusted to display only the initial 15 seconds of the signal waveforms 410, 420, 425, 430, and 440 representing the same audio soundtracks as described in FIG. 3. User interface 400 also displays a set of signal waveforms 435 representing the indication of the availability of an audio description associated with the media content package, as described above. The indication, referred to as the audio description indicator, represented by the set of signal waveforms 435 may be a tone or a short audio passage. As such, signal waveforms 420, 425 and 430 represent a set of modified main audio soundtracks, with the original or received main audio soundtracks associated with the media content package displayed as combined with one of the signal waveforms from the set of signal waveforms 435 respectively.

It is worth noting that the audio content for the audio description indicator represented by the set of signal waveforms 435 may be inserted electronically into the main audio soundtracks 420, 425, 435 using the audio software package (e.g., Pro Tools®) in the audio content processing device or may combined or inserted into the main audio soundtracks 420, 425, 430 by the user (e.g., production or audio engineer). The length of time associated with the audio content represented by signal waveforms 435 must also be accounted for, or included in, all other audio soundtracks that do not have one of the set of audio soundtracks 435 inserted or added. The added audio content may generally be represented as no signal and displayed in user interface 400 in order to maintain synchronization of the set of audio soundtracks. Further, synchronization information may need to be added to the set of audio soundtracks in order to maintain synchronization with other portions of the media content package, such as the video content stream(s). In user interface 300, the audio description soundtrack indication represented by signal waveforms 435 is included in each of the main audio soundtracks represented by signal waveforms 420, 425, and 430. However, in other embodiments, one or more of the signal waveforms 435 may be included in only a subset of the signal waveforms 420, 430, 435 representing the main audio soundtracks. Further, in user interface 400, each one of the set of signal waveforms 435 represents audio content for the audio description indicator that is different allowing, or accounting for, different properties and characteristics of each of the main audio soundtracks. However, in some embodiments, some or all of the set of display waveforms 435 may represent the same audio content.

Although not displayed in user interface 400, one of the set of signal waveforms 435 may also be included in signal waveform 440 representing the audio description soundtrack. Further one or more waveforms representing an indicator of a quality level for the audio description soundtrack may be included. The signal waveform(s) representing the indicator of a quality level for the audio description sound track may be included in addition to, or in place of the signal waveform(s) 435 and further may be included as audio content in any of the audio soundtracks represented by the display waveforms described above.

The user interface 400 further displays a set of signal waveforms 450, 455, and 460 representing a combining or mixing of the modified main audio soundtracks represented by signal waveforms 420, 425, and 430, including signal waveforms 435, with the audio description soundtrack represented by signal waveform 440. As such, signal waveforms 450, 455, and 460 represent a modified audio description soundtrack. The modified audio description soundtrack may be used and provided with the other audio soundtracks associated with the media package as described above. The modified audio soundtrack may be used as an alternative set of main audio soundtracks where the ability to deliver a plurality of audio soundtracks may be limited or where overlaying the audio description soundtrack on to the audio content presentation after delivering or distributing the media content to users or patrons is either not possible or not desirable.

It is worth noting that display waveforms 450, 455, and 460 represent one of many possible outputs resulting from the combination or mixing to produce a modified audio description soundtrack, as described above. For example, signal waveforms 455 and 460 representing the main left and right stereo audio soundtracks may be mixed together and further mixed with audio description soundtrack 440 to produce a single monaural modified audio description soundtrack. Further, the original surround sound 5.1 format audio soundtracks represented by signal waveforms 420 may be processed and remixed for a different set of audio soundtracks in a different surround sound format. Information regarding other various surround sound formats will be described in further detail below.

Although user interface 400 shows the set of display waveforms 435 representing the audio description indicator included or inserted at the beginning of the display waveforms associated with the main audio soundtracks. However, the audio description identifier may additionally be included and/or replicated in one or more of the main audio soundtracks at other points in time. Further, the audio description indicator may be added as a separate audio soundtrack and represented by its own signal waveform in user interface 400. The separate audio soundtrack, including the audio description indicator, may further be packaged with the remaining audio soundtracks for inclusion in the media content package as described above. The audio description indicator, as a separate audio soundtrack, may also be used as a separate media stream not attached to the media content. The audio description indicator may be reproduced as a separate audio signal and introduced into the media content before or during presentation of the content or reception of the media content stream. For example, the identifier may be selectively inserted prior to the start of a media content presentation in the same way that a content producer may insert a movie production identifier, often referred to as a "bumper".

Figure 5:
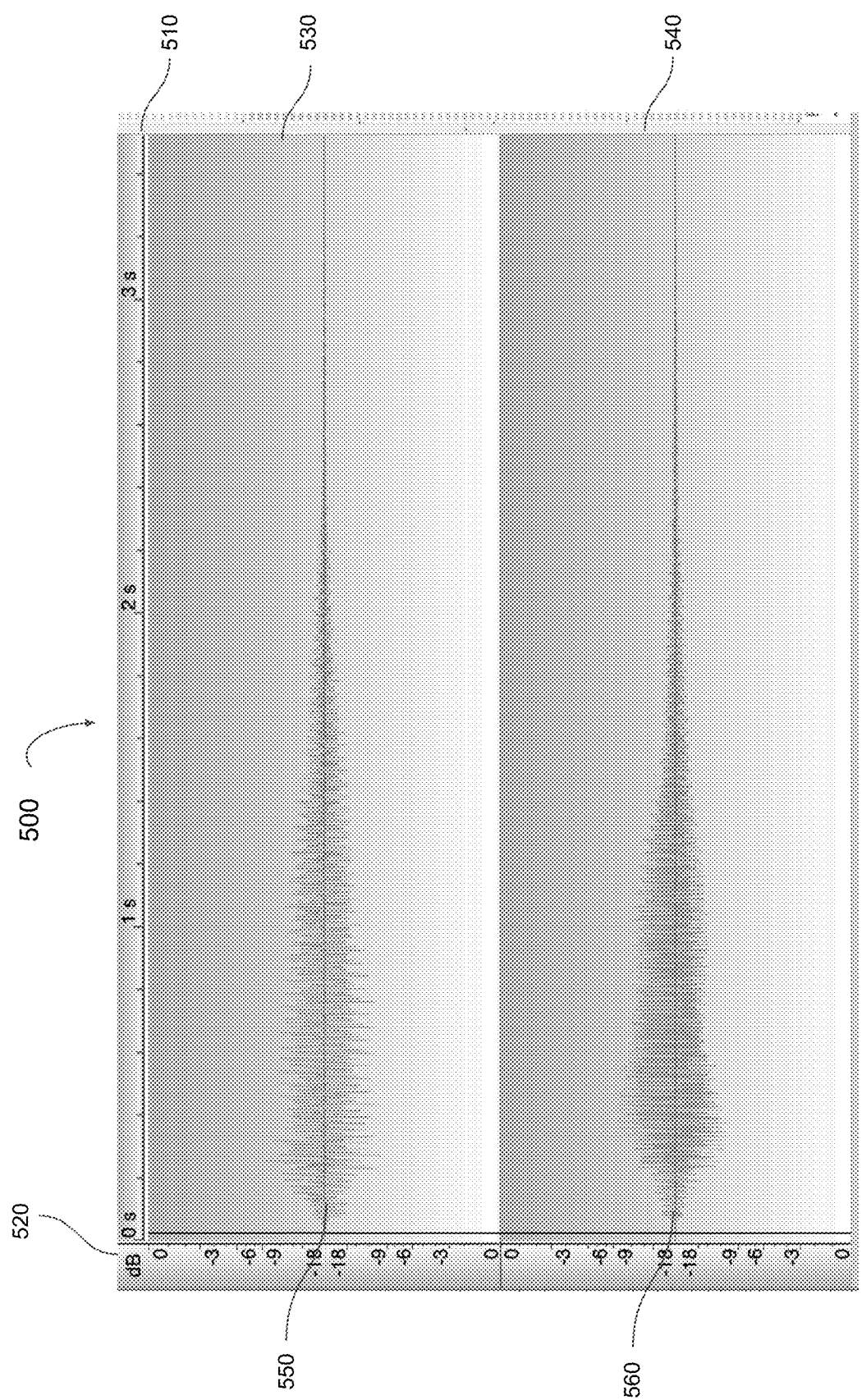
FIG. 5 is an exemplary diagram displaying a signal waveform representing an audio description indicator used as an indication of the availability of an audio description soundtrack associated with media content to which principles of the present disclosure are applicable.

FIG. 5 shows an exemplary diagram 500 displaying a signal waveform representing an audio description indicator used as an indication of the availability of an audio description soundtrack associated with media content according to aspects of the present embodiments. Diagram 500 includes a horizontal axis 510 displaying time in seconds and a vertical axis 520 displaying signal amplitude or level expressed in decibels (dB). The vertical axis 520 is further broken into two portions to indicate a first signal waveform region 530 representing audio for a left channel in a stereo audio configuration and second signal waveform region 540 representing audio for a right channel in a stereo audio configuration. Diagram 500 further includes a signal waveform 550, displayed in the waveform region 530, representing the audio content for an audio description indicator that is to be included in the left channel. diagram 500 also includes a signal waveform 560, displayed in the waveform region 540, representing the audio content for an audio description indicator that is to be included in the right channel. The elapsed time of both of the signal waveforms 550 and 560 is less than three seconds.

It is worth noting that although diagram 500 displays a signal waveform representing an audio description indicator, the signal waveform may also be used as an indication of quality for an audio soundtrack that represents or includes an audible form of written text and/or an audible description of a visual element. Further the signal waveform may also include only a single signal waveform region (e.g., signal waveform region 530) representing audio for a monaural channel.

The audio description indicator represented by signal waveforms 550 and 560 may be a separate predetermined audio file that may be stored in the audio workstation (e.g., in memory 280 in FIG. 2) or at a post-production facility (e.g., in storage device 130 in FIG. 1). The audio description indicator may be retrieved from storage and inserted in or mixed into one or more of the existing audio soundtracks, as described above, based on the requirements or standards associated with media content or the media content producers as described.

It is worth noting that a level of quality indicator, similar to the audio description indicator may similarly be represented by signal waveforms similar to signal waveforms 550 and 560. The level of quality indicator may be used in addition to, or in place of, the audio description indicator. The use and inclusion of the audio description indicator, as described in FIG. 5, in one or more of the main audio soundtracks associated with media content is important because the main audio soundtracks are nominally used for audio reproduction or playback of audio for all users or patrons. Further, the use and inclusion of a level of quality indicator is important because certain patrons may have different expectations for using audio description content based on whether that is in connection with theatrical releases of feature films, network broadcast content, streaming service content, or any medium of video and audio content that provides audio description. As such, the presence of the audio description indicator in the main soundtracks provides a notification to users or patrons desiring to listen to audio description content that an audio description soundtrack exists and exists as an alternate soundtrack. In other words, the audio description indicator and, if used, the level of quality indicator as described above, that may be present in one or more of the audio soundtracks is used to identify an alternate audio soundtrack that specifically contains audio description content and, in some cases, may also notify users that the audio description content will provide a certain level of performance or quality. Information about how the level of quality of an audio soundtrack is determined will be described in further detail below.

It is worth noting that although diagram 500 displays a signal waveform representing an audio description indicator and/or level of quality indicator, the signal waveform may also be also be used as an indication of quality or level of quality for an audio soundtrack that represents or includes an audible form of written text and/or an audible description of a visual element in a manner similar to that described above. Further the signal waveform may also include only a single signal waveform (e.g., signal waveform 550) representing audio for a monaural channel.

The audio description indicator described in FIG. 5 may be generated and/or converted and then inserted in a variety of signal formats for the main audio soundtrack(s) as described above including one of several specific multichannel or surround sound formats. TABLE 1 includes a list of possible multichannel or surround sound audio soundtrack formats in which the audio description indicator in FIG. 5, or any other form of audio indication, may be used to notify users (e.g., blind or low vision users) of the availability of an audio description soundtrack or used as the indication of a quality level of an audio description soundtrack. TABLE 1 also includes some additional information associated with each of the formats, such as the number and types of sound channels that may be included (either as one soundtrack or as separate soundtracks) and the type of media content with which the format may be used. The sound can be inserted into one or more main audio soundtracks for inclusion in media content based on the soundtrack file format used. The set of file formats listed in TABLE 1 should not be construed as an exhaustive list and other file formats, as well as other types of audio or media content, may also be supported based on need as development, including new and future development, continues.

TABLE 1

| Surround Format | Number Of Channels | Types of Channels | Types of Media with which the format may be used |
|---|---|---|---|
| Dolby ® Pro Logic ® | 4 | 2 discrete, full-bandwidth channels (front left and right) 1 matrixed full-bandwidth channel (center) 1 matrixed, limited-bandwidth channel (surround left and right) | Stereo and Dolby Surround-encoded VHS movies and broadcast TV programs Can be downconverted from any Dolby Digital source |
| Dolby Pro Logic II | 5.1 | 2 discrete, full-bandwidth channels (front left and right) 3 matrixed full-bandwidth channels (center, surround left and right) 1 subwoofer channel via Pro Logic II's bass management | Stereo and Dolby Surround-encoded VHS movies and broadcast TV programs Stereo music Some video games |
| Dolby Digital | Up to 5.1 | 5 discrete, full-bandwidth channels (front left and right, center, surround left and right) 1 discrete LFE channel (subwoofer) | All DVDs Some broadcast HDTV Some satellite and cable TV Some video games |
| DTS ® | 5.1 | 5 discrete, full-bandwidth channels (front left and right, center, surround left and right) 1 discrete LFE channel (subwoofer) | Some DVDs are DTS encoded Some CDs are DTS encoded |
| DTS Neo: 6 | Up to 6.1 | 2 discrete, full-bandwidth channels (front left and right) 3 or 4 matrixed full-bandwidth channels (center, surround left and right, and back right and left surrounds) 1 subwoofer channel via DTS neo: 6's bass management | Most audio sources connected to a Neo: 6-capable receiver |
| Dolby Pro Logic IIx | Up to 7.1 | 2 discrete, full-bandwidth channels (front left and right) 5 matrixed full-bandwidth channels (center, surround left and right, and back right and left surrounds) 1 subwoofer channel via Pro Logic IIx's bass management | Most audio sources connected to a Pro Logic IIx-capable receiver |
| Dolby Pro Logic IIz | Up to 9.1 | 2-7 discrete, full-bandwidth channels depending on audio source (front left and right, center, surround left and right, and back right and left surrounds) 2-7 matrixed full-bandwidth channels, depending on audio source (front right height, front left height, center, surround left and right, and back right and left surrounds) 1 subwoofer channel (discrete or via Pro Logic IIx's bass management, depending on audio source) | Most audio sources connected to a Pro Logic IIz-capable receiver |
| Dolby Digital EX | 6.1 | 5 discrete, full-bandwidth channels (front left and right, center, surround left and right) 1 matrixed, full-bandwidth channel (back surround) 1 discrete LFE channel (subwoofer) | Some DVDs are Dolby Digital EX encoded Regular Dolby Digital 5.1 DVDs can also be used with a Dolby Digital EX decoder |
| THX Surround EX ™ | 6.1 | 5 discrete, full-bandwidth channels (front left and right, center, surround left and right) 1 matrixed, full-bandwidth channel (back surround) 1 discrete LFE channel (subwoofer) | Can decode any Dolby Digital EX source Can be used to enhance Pro Logic, Pro Logic II, DTS, or DTS-ES decoding |

TABLE 1-continued

| Surround Format | Number Of Channels | Types of Channels | Types of Media with which the format may be used |
|---|---|---|---|
| DTS-ES ™ | 6.1 | 6 discrete, full-bandwidth channels (front left and right, center, surround left and right, and back surround) 1 discrete LFE channel (subwoofer) | Some DVDs are DTS-ES encoded Regular DTS 5.1 DVDs can also be used with a DTS-ES decoder |
| Dolby Digital Plus | 7.1 | 7 discrete, full-bandwidth channels (front left and right, center, surround left and right, and back left and right surround) 1 discrete LFE channel (subwoofer) | Some Blu-ray discs are encoded with Dolby Digital Plus Can be downconverted for playback on a 5.1-channel system As a lossless format, offers sound that's "bit-for-bit" identical to the original Recording for more detailed, accurate surround sound |
| DTS-HDM ™ | 7.1 | 7 discrete, full-bandwidth channels (front left and right, center, surround left and right, and back left and right surround) 1 discrete LFE channel (subwoofer) | Some Blu-ray discs are encoded with DTS-HD Can be downconverted for playback on a 5.1-channel system |
| DTS-HD Master Audio (lossless) | 7.1 | 7 discrete, full-bandwidth channels (front left and right, center, surround left and right, and back left and right surround) 1 discrete LFE channel (subwoofer) | Some Blu-ray discs are encoded with DTS-HD Can be downconverted for playback on a 5.1-channel system As a lossless format, offers sound that's "bit-for-bit" identical to the original recording for more detailed, accurate surround sound |
| Dolby Atmos ® | 5.1.2 and up | 5 discrete, full-bandwidth channels (front left and right, center, surround left and right) 1 discrete LFE channel (subwoofer) 2 in-ceiling speakers of Dolby enabled upward firing speakers that reflect sound off the ceiling | Some Blu-ray discs are encoded with Dolby Atmos soundtracks Creates a high, deep soundstage with a more "3D" sound than conventional surround set-ups Scalable to accommodate different setups Dolby recommends a 7.2.4 system for the best experience |

Figure 6:
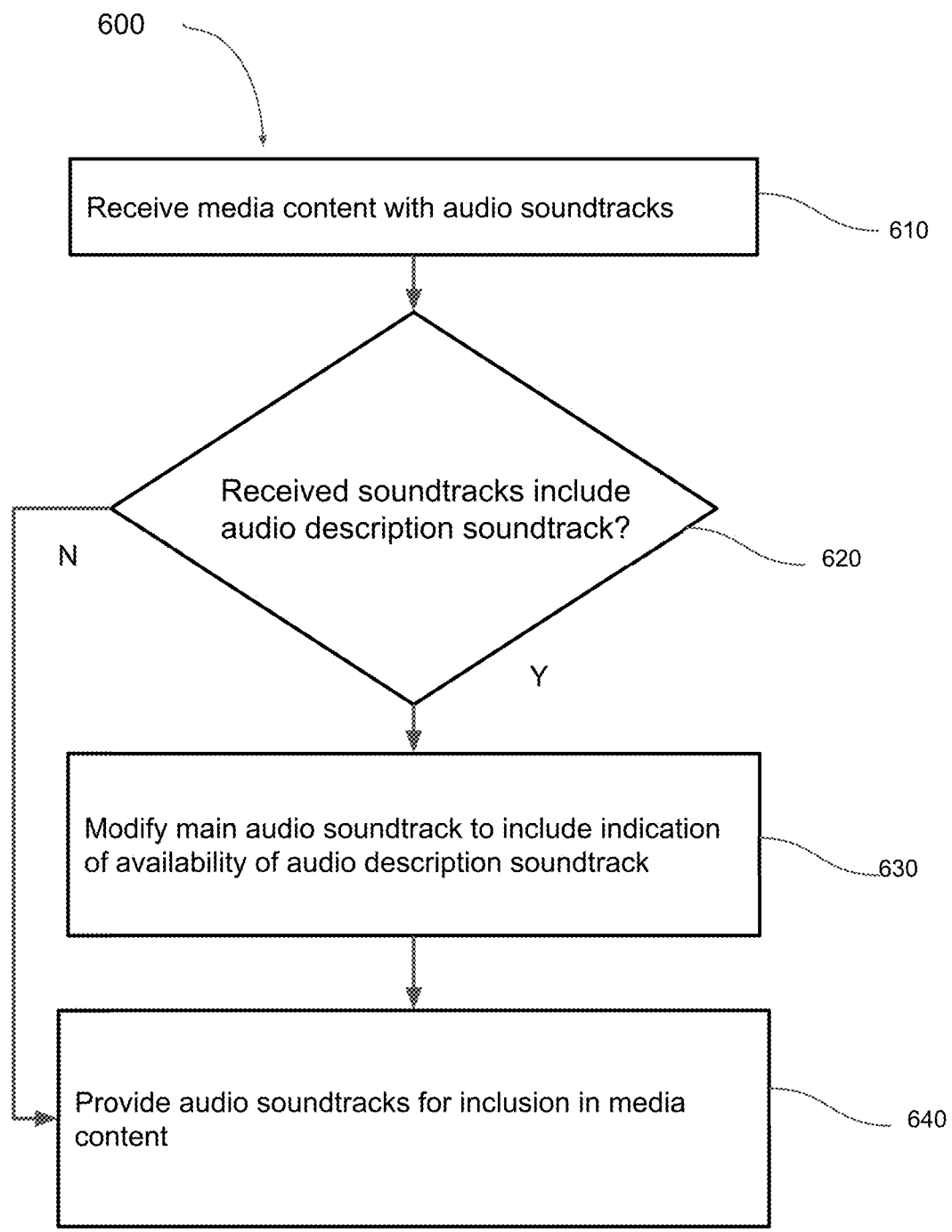
FIG. 6 is a flow chart of an exemplary process for inserting an indication of availability of an audio description soundtrack associated with media content to which principles of the present disclosure are applicable.

FIG. 6 shows a flow chart of an exemplary process 600 for inserting an indication of availability of an audio description soundtrack associated with media content according to aspects of the present embodiments. Process 600 is primarily described with respect to an audio processing device, such as audio workstation 200 in FIG. 2. Process 600 may also be performed by one or more devices that operate within a post-production system, such as media content processing device 120 and audio content processing device 140 in FIG. 1. It is worth noting that such a device may include a computing device, such as a processor, a microprocessor, or a server device, and one or more memories for storing operating code implementing one or more elements of process 600 described herein. Although process 600 describes steps performed in a particular order for purposes of illustration and discussion, the operations discussed herein are not limited to any particular order or arrangement. One skilled in the art, using the disclosure provided herein, will also appreciate that one or more of the steps of process 600 may be omitted, rearranged, combined, and/or adapted in various ways.

At step 610 a set of audio soundtracks associated with media content are received (e.g., at audio content interface 210). The set of audio soundtracks include one or more main audio soundtracks that are intended for sound reproduction to a general audience. The set of audio soundtracks may also include one or more auxiliary audio soundtracks as described above.

At step 620 a determination is made as to whether one of the audio soundtracks (e.g. one of the auxiliary soundtracks) in the received set of audio soundtracks is an audio description soundtrack associated with the media content. The determination may be performed using a visual audio comparison of soundtrack file content or may be determined using hardware and/or software processing in the soundtrack processor 230. The processing may include an electronic comparison of the data files for the audio soundtracks or extraction and comparison of metadata associated with the audio soundtracks as described above.

If at step 620, the determination is made that one of the of the audio soundtracks in the set of audio soundtracks is an audio description soundtrack, then at step 630, one or more of the main audio soundtracks is modified to include an indication that an audio description soundtrack is available for the media content. The modification may be performed using the soundtrack processor 230. For example, if five main audio soundtracks are present, such as is used for surround sound 5.1, then the front left and front right soundtracks in the surround sound 5.1 audio soundtracks may be modified to include the indication. It is worth noting that the audio description soundtrack may also be modified to include the indication.

In some embodiments, the indication may be a sound inserted or mixed into the soundtrack(s). For example, the sound may include a combination of at least one tone having a frequency of an A note and at least one tone having a frequency of a D note. The sound may be limited in length of time, such as to a maximum of three seconds, in order to limit any adverse effect on the presentation or reproduction of the media content itself. The sound may be inserted or mixed into the audio soundtracks, using the soundtrack mixer 240, at a single time location in the soundtrack(s), such as at the beginning of the audio soundtracks. The sound may alternatively, or additionally be inserted at other time locations in the soundtracks including, but not limited to, natural break points, such as commercial break points, in the media content.

In some embodiments, the determination, at step 620, may further include determining a quality level of the audio description soundtrack. The quality level may be determined using one or more quality levels or tiers that are established for the audio description soundtrack based on sets of different criteria. An exemplary arrangement of quality levels or tiers, along with criteria, will be described in further detail below. Additionally, in some embodiments, the modifying, at step 630, may further include modifying one or more of the soundtracks in the set of soundtracks to include an indication of the quality level of the audio description soundtrack. For example, the indication of the quality level may be a sound that is different from the indication that the audio description soundtrack is available for the media content. Further, a different sound may be used for each quality level with different sounds being graduated in some audio characteristic to indicate the different levels of quality.

In some embodiments, the one or more modified main audio soundtracks may be combined or mixed, in soundtrack mixer 240, with the audio description soundtrack to produce a modified audio description soundtrack. The modified audio description soundtrack is included in the set of audio soundtracks processed in soundtrack packager 270 either in addition to, or in place of the original audio soundtrack.

If, at step 620, it is determined that one of the soundtracks in the set of soundtracks is not an audio description soundtrack, then process 600 proceeds to step 640 without modifying any soundtracks to include the indication described at step 630. At step 640, the set of separated audio soundtracks are repackaged, in soundtrack packager 270 following any other audio processing performed using audio workstation 200, into an audio content stream and provided to the audio content interface 210 for inclusion in the media content as described above.

The generation of the audio description content involves a number of elements that may be included as part of evaluating a level of quality of an audio description soundtrack. These elements may include scripting, casting, narration, direction, audio content signal processing, audio content timing and placement, quality control, and ease of access for delivery and use. Many of these elements are highly subjective and more difficult to measure as a criterion for level of quality. For instance, casting is often important for the human aspect such as representation of point of contact (POC) and disabled talents' inclusion in the generation. Similarly, direction is highly personal and may be impossible to characterize as a general criterion for level of quality. Additionally, ease of access for delivery and use is often a tradeoff involving costs and other factors that may be difficult to completely ascertain, notwithstanding the inherent content delivery or use scenario discrepancies.

Others of the elements mentioned above are more objective and are often measurable. Of these, scripting and narration or the reading mechanism may be most important around which to create a set of criteria for level of quality while audio content signal processing, audio content timing and placement, and quality control are the easiest to characterize.

Scripting involves determining what the narration content should be and, in some cases where it should be placed, in order to fit the dialog already present most easily in the media content, usually with minimal interference or distraction. Human scripting of audio description content involves viewing a program and writing a script describing the visual elements which are important in understanding what is occurring at the time and the plot as a whole. The script may then be read or narrated by a description reader or provided for computer synthesized narration during periods of complete or relative lack of dialog within the program. The following represents a narration that may be inserted at the opening of a popular children's television series:

"Arthur wears round glasses with thick frames over his big eyes. He has two round ears on top of his oval-shaped head. Walking down the sidewalk, he notices another aardvark. They wave."

Computer generated scripting is also possible using some form of a content analysis algorithm that generates a description for the visual content. The computer scripting mechanism may have constraints programmed in and/or may be modified as needed through human or computer script editing. The final script may be used to generate the audio description content either using a voice synthesis program in the computer or through a reading by a human.

The length of descriptions and their placement by a producer into the program are largely dictated by what can fit in natural pauses in dialogue. It is important to note that producers who manage audio description content may have other priorities, such as synchronization with the timing of a described element's appearance, which may differ from the requirement of priority for detail from the narration.

The variation of types of ways that the audio description content may be created, generated, produced, inserted, and modified is a primary reason for the introduction of a unified, recognizable indication for the availability of audio description content as well as an indication of quality level based on a set of quality levels or tiers. An exemplary a set of four quality levels or tiers are indicated here:

Quality tier one: Synthetically (computer) generated audio description content with computer generated scripting.

Quality tier two: Synthetically (e.g., machine or computer) generated audio description content with human generated scripting.

Quality tier three: Basic human generated audio description (i.e., no emotional nuance) with either human or computer generated scripting, the audio description being generated using an automated sound mix.

Quality tier four: Professional human generated audio description (with emotional nuance) with human generated scripting, the audio description being generated using a human controlled sound mix.

The presence of the audio description indicator, as well as the level of quality indicator when used, can provide assurance to the end user or patron that the audio description content will provide the necessary additional information about the visual media content in an audible form without impairing, or indeed improving, the enjoyment of the media content by the user or patron.

The techniques and quality levels or tiers described as applicable to the generation of the audio description soundtrack described above, can be applied equally to other audio soundtracks that represent an audible form of written text and/or an audible description of a visual element. For example, an audio description narrator reads a script of text that is provided, into a microphone recording the voice onto an audio soundtrack or file. Similarly, an audiobook narrator, or even a voice over artist, reads a book's text into a microphone to generate the audio soundtrack or file. So for audiobooks, the source material book's text becomes the script the narrator reads with the only difference being the timing of the spoken delivery has a different set of constraints, that being primarily structurally limited versus conversational. A computer generated voice, using synthesis mechanisms, even artificial intelligence allowing for the creation of voice doubling, voice cloning, or composite voice synthesis, is not the same as human voice reading. While a computer generated voice can be programmed with emotional nuance, adding breaths, and sound conversational, such approaches still lack the originality, complexity, and spontaneity of a human's actual voice.

Figure 7:
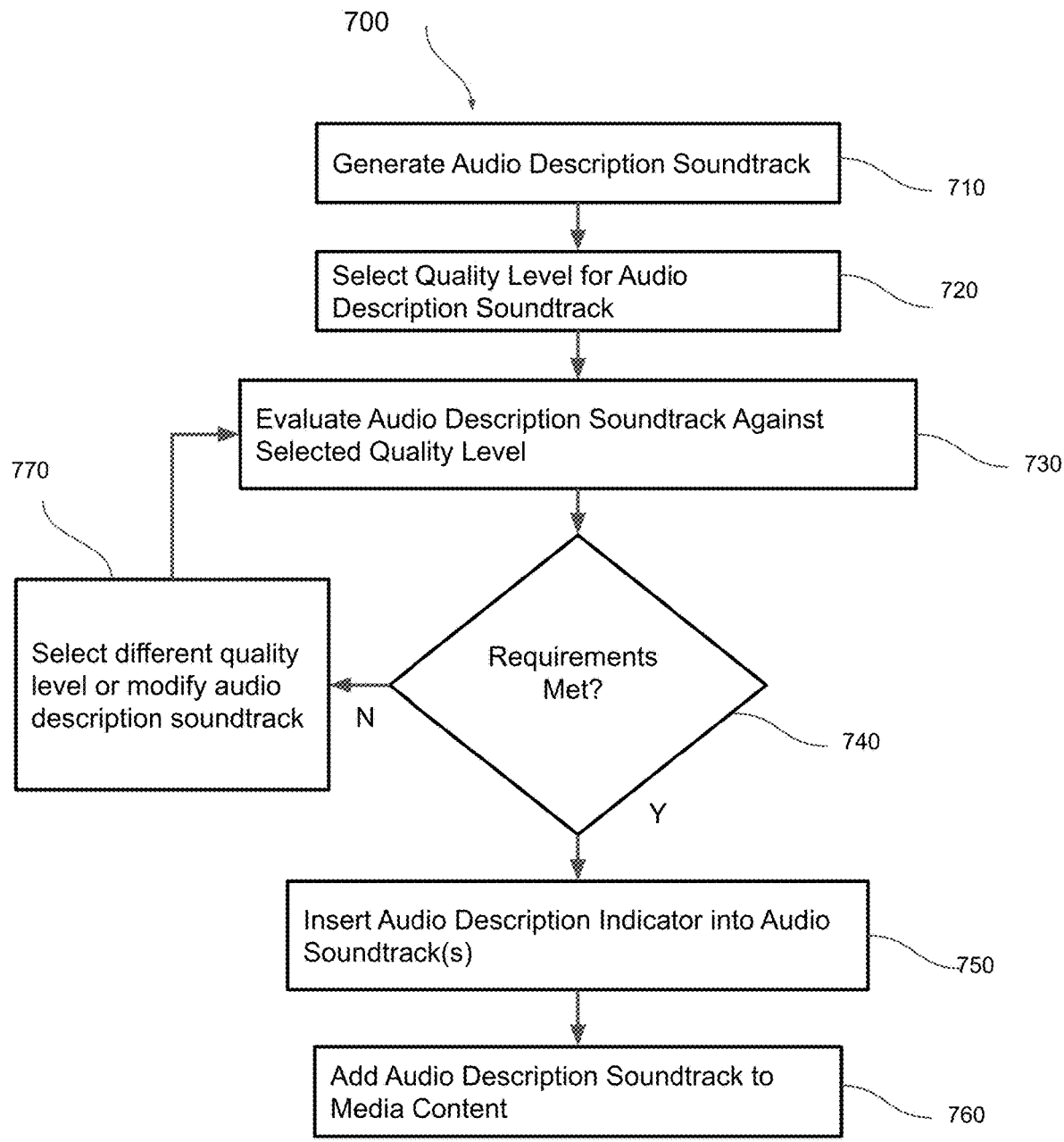
FIG. 7 is a flow chart for an exemplary process for generating and evaluating an audio description soundtrack for use in media content to which principles of the present disclosure are applicable.

FIG. 7 shows a flow chart for an exemplary process 700 for generating and evaluating an audio description soundtrack for use in media content according to principles of the present embodiments. Process 700 is primarily described with respect to an audio processing device, such as audio workstation 200 in FIG. 2. Process 700 may also be performed by one or more devices that operate within a post-production system, such as media content processing device 120 and audio content processing device 140 in FIG. 1. It is worth noting that such a device may include a computing device, such as a microprocessor or a server device, and one or more memories for storing operating code implementing one or more elements of process 700 described herein. Although process 700 describes steps performed in a particular order for purposes of illustration and discussion, the operations discussed herein are not limited to any particular order or arrangement. One skilled in the art, using the disclosure provided herein, will also appreciate that one or more of the steps of process 700 may be omitted, rearranged, combined, and/or adapted in various ways.

At step 710, audio description content is generated and formed into an audio description soundtrack. The audio description content may be generated or formed in order to be included in a set of audio soundtracks associated with media content. As mentioned above, the audio description content may be generated locally (e.g., at a post-production facility using audio capture device 150 and/or audio content processing device 140 in FIG. 1) or may be generated at a different location or facility and provided for processing in a post-production system. The audio description content, or screen and context description content, may be scripted ahead of the generating, at step 710, such as when the scripting is done partially or completely under human control. The scripting may also be done as part of the generating, such as when the scripting is done completely under computer control as part of a synthetic generation mechanism for audio description content.

At step 720, a level of quality is selected as part of the evaluation of the generated audio description soundtrack. The level of quality may be selected by a user (e.g., a production or audio engineer) from one of a set of quality levels or quality tiers through a user interface (e.g., user interface 290) and entered memory (e.g. memory 280) in the audio workstation. For example, the set of quality levels may include four quality levels ranging from machine or computer scripted and machine or computer generated scene and context description content to human generated scripting and professional human read scene and context description content.

At step 730, the audio description soundtrack is evaluated against one or more criteria elements, similar to the criteria elements described above, for the selected quality level similar to some of the criteria described above. The criteria may be based on objective requirements or conditions using information associated with audio description soundtrack, such as metadata included with the audio description soundtrack and tonality or other measurable audio characteristics of the audio description soundtrack. The criteria may further be based on more subjective requirements or conditions, such as delivery effectiveness of scene and context description content. Further, each quality level or tier may have varying criteria and may have a different mix of objective and subjective criteria. For example, evaluation of the criteria for the machine or computer scripted and machine or computer generated may be completely objective and evaluated using hardware and/or software included in either an audio workstation (e.g., audio workstation 200 in FIG. 2)) or one or more components or devices in a post-production facility (e.g., post-production facility 100 in FIG. 1).

At step 740, a determination is made as to whether the requirements associated with the selected quality level with respect to the audio description soundtrack, at step 730, have been met. In some embodiments, the determination may include a determination that a threshold number of requirements met or a threshold value score from the requirements have been exceeded. The threshold number of requirements or threshold value may be predetermined or specified based on an established set of minimum requirements or standards for the audio description content at the specified or selected level. In some embodiments, some or all of the determination, at step 740, may be performed using audio processing in an audio processing circuit (e.g., soundtrack processor 230).

If, at step 740, it is determined that the audio description soundtrack at least meets the requirements, then, at step 750, an indication of the quality level of the audio description is inserted into one or more of the audio soundtracks that are associated with the audio description soundtrack. The indication may also be inserted into the audio description soundtrack. The indication may be inserted by modifying the audio soundtrack(s) to mix or combine the indication with the soundtrack(s) in a manner similar to the techniques described above using components in an audio workstation (e.g., soundtrack processor 230 and soundtrack mixer 240). Also, as described above, the indication may be a short, recognizable, or distinctive sound added to one or more of the main audio soundtracks and/or the audio description soundtrack and may be different from the indication used for the availability of an audio description soundtrack that is associated with the media content. In some embodiments, other indications may be used such that they serve the purpose of providing notification of the presence and quality of the audio description as used by patrons or users who are blind or low vision.

At step 760, the generated audio description soundtrack may be added to the set of audio soundtracks that are associated with the content media and further processed and/or repackaged using audio workstation 200 such as has been described above.

If, at step 740, it is determined that the audio description soundtrack does not meet the requirements, then, at step 770, a different quality level may be selected or the audio description soundtrack received or generated, at step 710, may be modified. In some embodiments, a message may be provided on a display as part of a user interface (e.g. user interface 290) notifying the user (e.g., production or audio engineer) that the audio description soundtrack did not meet the requirements for the selected quality level. Process 700 then returns back to step 730 where either the generated audio description soundtrack is re-evaluated using a newly selected quality level or the modified audio description soundtrack is re-evaluated using the originally selected quality level.

Figure 8:
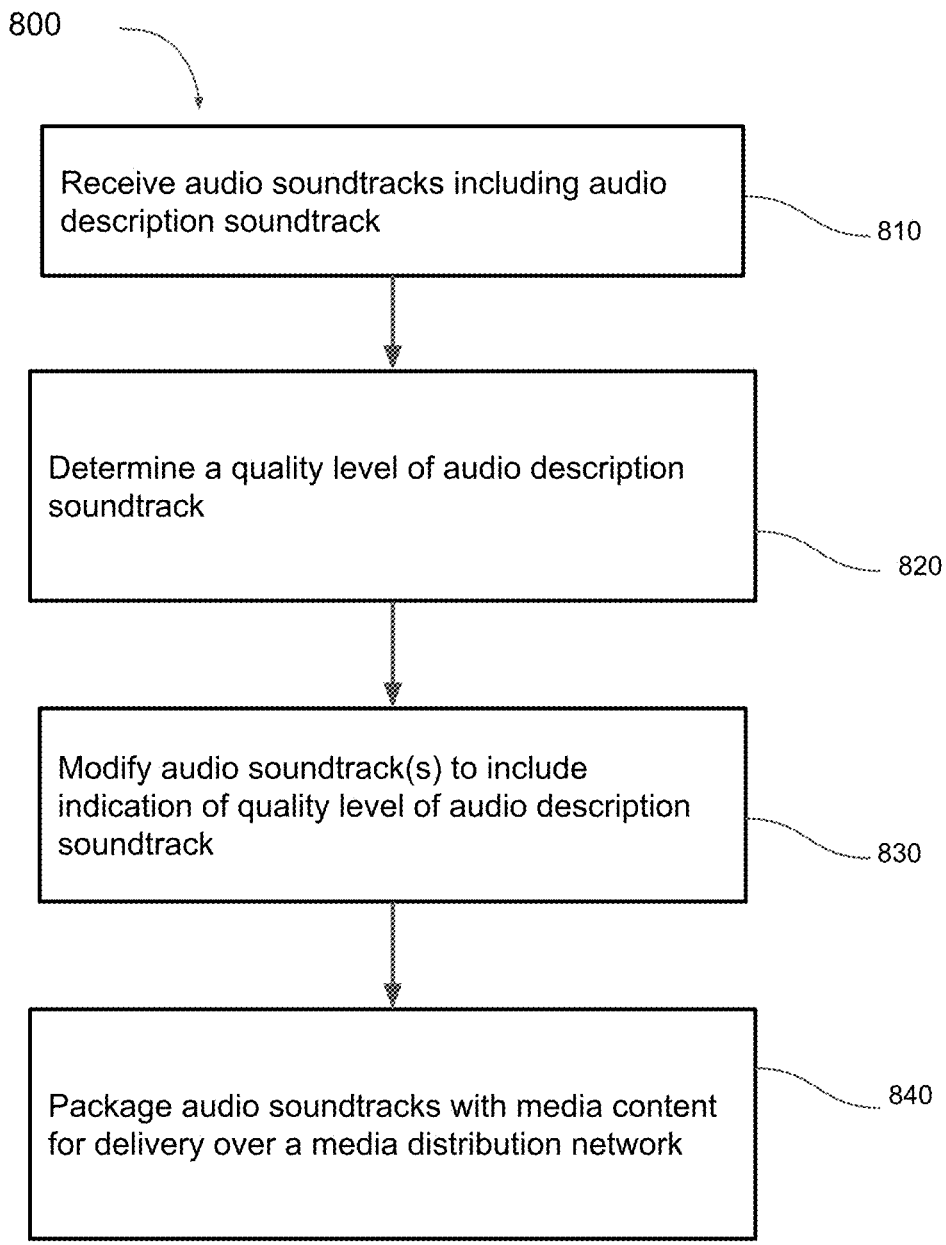
FIG. 8 is a flow chart for an exemplary process for providing an indication of the quality level of an audio description soundtrack used in media content to which principles of the present disclosure are applicable.

FIG. 8 shows a flow chart for an exemplary process 800 for providing an indication of the quality level of an audio description soundtrack used in media content according to principles of the present disclosure. Process 800 is primarily described with respect to an audio processing device, such as audio workstation 200 in FIG. 2. Process 800 may also be performed by one or more devices that operate within a post-production system, such as media content processing device 120 and audio content processing device 140 in FIG. 1. It is worth noting that such devices may include a computing device, such as a microprocessor or a server device, and one or more memories for storing operating code implementing one or more elements of process 800 described herein. Although process 800 describes steps performed in a particular order for purposes of illustration and discussion, the operations discussed herein are not limited to any particular order or arrangement. One skilled in the art, using the disclosure provided herein, will also appreciate that one or more of the steps of process 800 may be omitted, rearranged, combined, and/or adapted in various ways.

At step 810, a set of audio soundtracks, including an audio description soundtrack, associated with media content is received at an audio workstation (e.g., audio content interface 210 in FIG. 2). In some embodiments, the receiving, at step 810, may include determining whether an audio description soundtrack is included in the set of audio soundtracks. The determining, as part of step 810, may be performed using one or more processing circuits or elements (e.g., soundtrack processor 230) in an audio workstation. If an audio description soundtrack is not included, then process 800 may be exited without further processing or a process for generating and evaluating an audio description soundtrack, such as process 700 in FIG. 7, may be initiated.

At step 820, the quality level of the audio description soundtrack may be determined. The quality level may be determined, at step 820, using one or more quality levels or tiers that are established for the audio description soundtrack based on sets of different criteria, such as those described above. In one embodiment, at least one of the quality levels is a level identifying that the scene and context description included in the audio description soundtrack is computer generated. In embodiments that involve computer generated scene and context description content in the audio description soundtrack, audio analysis tools available in an audio signal processor (e.g., soundtrack processor 230) may be used to determine the quality level, at step 820. In some embodiments, metadata included with audio description soundtrack or other external information regarding the audio description soundtrack may be processed, including electronically (e.g., in soundtrack processor 230), to determine the quality level.

At step 830, one or more of the audio soundtracks associated with the media content are modified to include an indication of quality level of audio description soundtrack. The modification, at step 830, may be performed using an audio signal mixer (e.g., soundtrack mixer 240) and/or audio signal processor (e.g., soundtrack processor 230). The modification, at step 830, may include inserting the indication of quality level into one or more of the main audio soundtracks as well as the audio description soundtrack using soundtrack processor 230. In some embodiments, the indication of quality level may replace, and also serve as, the indication of availability of the audio description soundtrack in the audio soundtracks. As described above, the indication of quality level may be a short sound similar to the indication of availability described above and may be inserted at the beginning of the audio soundtracks as well as at other strategic times within the audio soundtracks. In some embodiments, each quality level has a different indication of quality level. For instance, each quality level uses the same base set of audio tones, but the amount of orchestration based on added audio tones is raised as the quality level is raised. In some embodiments, at step 830, the set of audio soundtracks may also be repackaged (e.g., in soundtrack packager 270) to produce a final processed set of audio soundtracks associated with the media content.

At step 840, the set of audio soundtracks, including any modified audio soundtracks, are packaged with the remaining portions of the media content package in a media content processing device (e.g., media content processing device 120 in FIG. 1). The packaged media content is further provided to content distributors through a secure communication device (e.g., secure network device 110 in FIG. 1) for delivery over a media distribution network to the public for use as entertainment. In some embodiments, at step 840, the packaged media content may be additionally or alternatively provided to media servers used by content producers. The content producers may distribute or release the media content for use in a live or cinema presentation.

It is worth noting that, as has been indicated above, parts of one or more of the processes 600, 700, and 800 may be used in combination. For example, process 600 may be modified to include steps 820 and 830 described in process 800 without also requiring the other steps in process 800. Such combinations are intentional as well as expected and should not be considered outside the scope of the embodiments of the present disclosure.

Several delivery and associated signal reception mechanisms may be employed for providing audio description content to a user (e.g., a blind or low vision user). In either live performances or theater settings, a separate dedicated device may be provided to the user. In a broadcast content delivery system or in an on-demand or streaming delivery system, a signal receiver may include options for selecting the audio description content from a set of possible audio content selections. Further, some delivery systems may operate in simulcast allowing an external device to be synchronized and to reproduce or play back the audio description content associated with the media content at the same time as the other portions of the media content are being reproduced or played back using a different device or mechanism.

Figure 9:
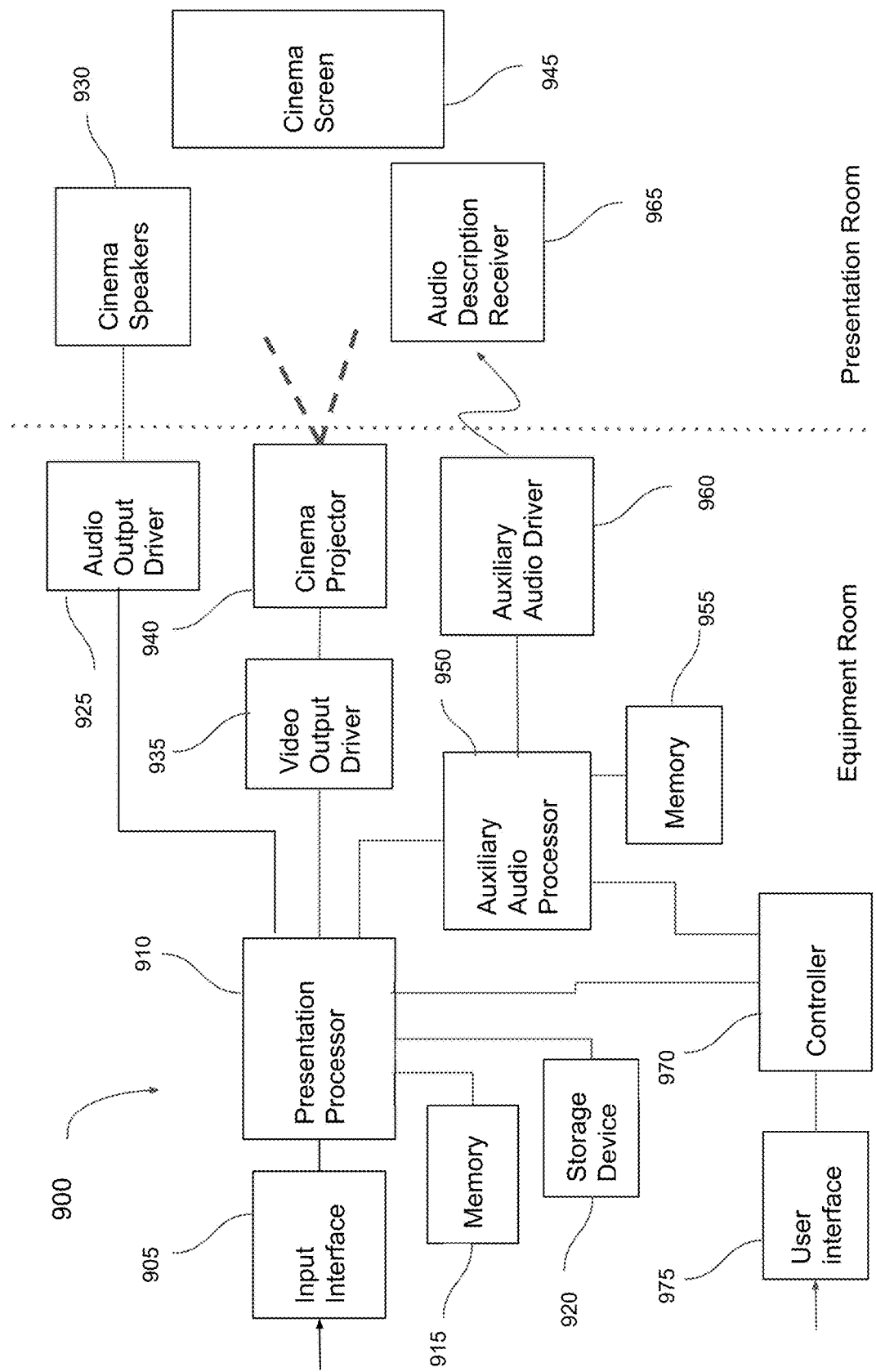
FIG. 9 is a block diagram of an exemplary cinema facility system used for presenting media content including audio description content to which principles of the present disclosure are applicable.

FIG. 9 shows a block diagram of an exemplary cinema facility system 900 used for presenting media content including audio description content according to principles of the present disclosure. Cinema facility system 900 has the capability for processing media content, arranged as a cinema package, provided by a content producer. The cinema package includes a plurality of streams of media content, such as a video stream, a set of audio soundtracks, and a data stream. Additionally, the cinema package includes a data file that is used for managing or controlling the reproduction and display of the media content in cinema facility system 900. Cinema facility system 900 is divided into a presentation room and an equipment room. The presentation room is used by the patrons of the cinema facility during a presentation, such as a movie. The equipment room is used by the operators of the cinema facility system 900 for housing most of the equipment necessary for the presentation, and additionally is usually not accessible by the patrons.

An input data stream, representing a cinema package of media content, is input through the input interface 905. The input interface 905 provides the necessary signal conversion from the delivery format and signaling protocol to a data interface more readily processed within the equipment in the equipment room of cinema facility system 900. The converted data stream from the input interface 905 is provided to a presentation processor 910. The presentation processor 910 separates the converted input data stream into sets of individual media presentation content, such as picture, audio, subtitles, and auxiliary media content. The presentation processor 910 also separates and decodes any code instructions (e.g., in a data file) supplied as part of the cinema package. The presentation processor 910 operates on the incoming converted data stream based on the code instructions provided within the cinema package. The presentation processor 910 may operate using additional instructions included internally for the equipment room at the cinema facility. The presentation processor 910 may also separate and decode any security information and may perform such functions as key validation for valid receipt of the cinema. The presentation processor 320 may also provide initial signal processing for the individual presentation content streams.

The presentation processor 910 also processes content synchronization information for the presentation. The synchronization information may be supplied along with, or as part of, the instructions provided in the cinema package. Synchronization of the delivery of various forms of media content, such as the video stream and the plurality of audio soundtracks, to the patrons then proceeds based on instructions provided with the cinema structure as well as instructions within the presentation processor 910. Time base information required to perform the synchronization may also be supplied within the instruction provided in the cinema package or, alternately, may be generated by the presentation processor 910.

A memory 915 is coupled to the presentation processor 910. Memory 915 may be used to store portions of the incoming converted data stream as well as portions of the presentation signals in order to facilitate content synchronization. Memory 915 may also be used to store control information and operating code for the presentation processor 910 as well as intermediate computational values for any processing. In a preferred embodiment, memory 915 is in the form of RAM and is used for all memory requirements. In another embodiment, memory 915 includes RAM for operations control of the presentation processor 910 as well as storage of portions of the data stream and presentation signal. A ROM is also included and used to store initialization and control software for the presentation processor 910.

A storage device 920 is also coupled to the presentation processor 910. The storage device 920 has more storage capacity than the memory 915 and may also be capable of storage over a longer period of time. Storage device 920 may be used to store larger segments of the incoming converted data stream. Alternatively, storage device 920 may store an entire cinema package, allowing the cinema facility system 900 to essentially download a cinema package from a content producer in its entirety prior to processing using the presentation processor 910. In a preferred embodiment, storage device 920 is a magnetic hard disk drive.

The presentation processor 910 outputs several presentation signals, including a video or picture signal, one or more main audio signals, and one or more auxiliary audio signals as required for presentation. In some embodiments, the presentation processor 910 may also output one or more auxiliary presentation signals. The video or picture signal from the presentation processor 910 is provided to the video output driver 935. The video output driver 935 provides the digital picture signal to the cinema projector 940. The cinema projector 940 receives the digital picture signal and generates a light emitting picture output for display in the presentation room of the cinema facility. In a preferred embodiment, the cinema projector 940 receives a picture content signal in the form of a digital data stream representative of the luminance levels of the three colors red, green, and blue. Picture information pertaining to each of these colors is separated and provided to a digital light projection (DLP) circuit that uses a high intensity polarized light source in order to produce and project the picture through an opening in the wall adjoining the two rooms in the cinema facility. The projected light source, representing the cinema presentation picture image, is projected to the other end of the presentation room, and displayed on the cinema screen 945.

One or more main audio signals from the presentation processor 910 are provided to the audio output driver 925. The audio output driver 925 provides the audio presentation signal to the cinema speakers 930. The audio output driver 925 and/or cinema speakers 930 may include additional signal processing such as audio equalization and/or amplification. The number and location of the speakers used in the presentation room may vary depending on requirements and design. In an embodiment, the cinema speakers 930 include six speakers located with three on each side wall of the presentation room of the cinema facility. The six speakers are positioned equidistant spanning the length of a side and pointed perpendicular to the cinema screen 945.

One or more auxiliary audio signals from the presentation processor 910 are provided to the auxiliary audio processor 950. The auxiliary audio processor 950 provides any additional processing of the auxiliary audio soundtrack signals as necessary. The auxiliary audio processor 950 manages the auxiliary audio soundtrack signal(s) and also manages any additional auxiliary data. In some embodiments, one of the auxiliary audio soundtrack signals is an audio description soundtrack signal that was processed as described above prior to being received by the cinema facility system 900. The audio description soundtracks may be used by patrons (e.g., patrons who may be blind or low vision) in place of, or in addition to, the main audio soundtracks. It should be noted that although the presentation processor 910 and auxiliary audio processor 950 are illustrated as separate processors, the processors may be combined into a single processor as known by those skilled in the art.

A memory 955 may be connected to the auxiliary audio processor 950. Memory 955 may primarily store portions of the auxiliary audio soundtrack content or any additional auxiliary data to facilitate synchronization between the main audio soundtracks and the auxiliary audio soundtracks. Memory 955 may also be used to store control information and operating code for the auxiliary audio processor 950 as well as intermediate computational values for any processing. In one embodiment, memory 950 is in the form of RAM and is used for all memory requirements for the auxiliary audio processor 950.

The one or more auxiliary audio signals are output from the auxiliary audio processor 950 to the auxiliary audio driver 960. The auxiliary audio driver 390 may format the auxiliary audio signal(s) into a suitable wireless transmission signal such as a wi-fi signal compliant with the institute of electrical and electronics engineers (IEEE) standard 802.11. The auxiliary audio driver 390 may also process the transmission signal to add elements such as error correction, as required by a particular transmission standard or as is well known to one skilled in the art. The auxiliary audio driver 960 may also include all of the circuitry and elements for providing the transmission signal including, but not limited to, encoders, modulators, transmitters, and antennas.

A controller 970 is connected to both the presentation processor 910 and auxiliary audio processor 950. Controller 970 may manage the interaction between the two processors as well as execute or process instructions delivered with the cinema package. Controller 970 may also maintain identifiers for devices capable of and/or receptive of delivery of one or more of the auxiliary audio soundtrack signals from auxiliary audio driver 960.

A user interface 975 is connected to controller 360 and may allow interactive control information between a person operating or controlling the presentation and the various elements or components in the equipment of the cinema facility. The user interface 975 may include, or provide external connections for, a control display monitor, touch screen system, mouse, and/or keyboard.

The processed auxiliary audio signal, including an audio description content stream, is transmitted from auxiliary audio driver 960 and may be received by an audio description receiver 965 used by a patron in the presentation room (e.g., a blind or low vision patron). The audio description receiver 965 receives the transmitted auxiliary audio signal decodes the content to recover and process the audio description content signal containing audio description content. The audio description signal is provided to the patron via the audio description receiver 965 (e.g., through audio reproduction elements such as headphones). The audio description receiver 965 may be embodied as a wireless network or Wi-Fi signal receiver, an audio signal receiver, a cellular phone, or a proprietary communications device. The audio description receiver 965 may further include user controls for permitting a patron to control operation.

In some embodiments, the main audio signals may include an indication, added as part of creation of, and included with, the media content in the cinema package, that an audio description soundtrack associated with the media content in the cinema package is available. A patron may recognize the indicator and access the audio description soundtrack signal though the auxiliary audio driver 960 using an audio description receiver 965.

Figure 10:
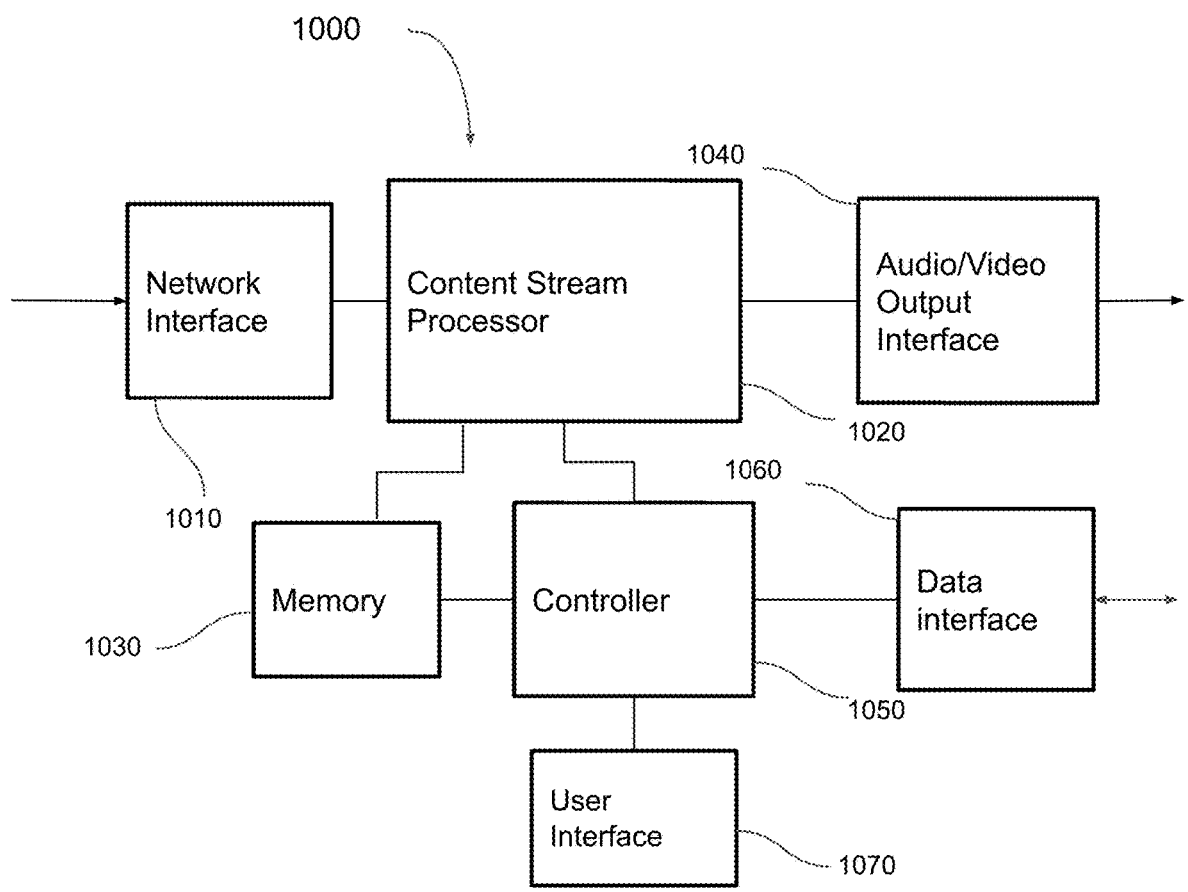
FIG. 10 is a block diagram of an exemplary media content receiving device used with media content including an audio description soundtrack to which principles of the present disclosure are applicable.

FIG. 10 shows a block diagram of an exemplary media content receiving device 1000 used with media content including an audio description soundtrack according to the embodiments of the present disclosure. The media content receiving device 1000 may typically operate in a user's residence and may be connected to a broadcast or internet communication network either directly or through a home communication network. The media content receiving device 1000 further includes the capability of receiving, decoding, and delivering audio description content, as described and processed above, to a blind or low vision user as part of the media content package or program received from a media content distributor over the broadcast or internet communication network. The receiving device may be included as part of a settop box, a television, a computer, or other similar electronic media content device available to users. It is worth noting that in some embodiments, all or a portion of media content receiving device 1000 may be included in portable or mobile devices that additionally have the ability to access media content over a wireless or cellular network. Examples of portable or mobile devices include, but are not limited to, a laptop computer, a tablet computer, a cellular phone, a portable media player, and the like.

In media content receiving device 1000, a communication signal containing a media content data stream is delivered to network interface 1010. Network device 1010 is coupled to content stream processor 1020. Content stream processor is coupled to memory 1030 and controller 1050. Memory 1030 is also coupled to controller 1050. Controller 1050 is coupled to user interface 1070. Controller 1050 is also coupled to data interface 1060, which provides reception and delivery of data with external data devices. Content stream processor 1020 is also coupled to an audio/video output interface which provides one or more output signals to external audio and/or video reproduction and display devices.

The network interface 1010 provides a communication connection to one or more of a home network or a wide area network. The network interface 1010 may support wired network connections including but not limited to, Ethernet, cable broadcast, and digital subscriber line broadcast. The network interface 1010 may also have one or more wireless network connections including, but not limited to, Wi-Fi, Bluetooth, cellular data 3G, 4G, 5G, satellite broadcast, and over the air broadcast. Further, network interface 1010 may include any physical interface elements, such as registered jack (RJ)45 jacks, coaxial cable jacks, and/or various wireless frequency antennas. Network interface 1010 may additionally include any circuitry for tuning, demodulating, and decoding the signals received using any protocol associated with the above mentioned communication networks as well as encoding and modulating any signals transmitted back on to those communication networks. In this way, network interface 1010 acts as both a receiver for media content delivered over the network at the media content receiving device 1000 as well as a transmitter for signals transmitted back out to the same network from the media content receiving device 1000.

The media content signal recovered from the communication signal received at the network interface 1010 is provided to the content stream processor 1020. The content stream processor 1020 processes the media content signal to extract and separate the video content portion from the audio content portion as well as a data or metadata portion. The video content portion is further processed to generate a digital video display signal. The audio content portion is further processed to generate one or more audio signals for audio reproduction. The data portion is processed to recover, among other things, the timing and synchronization information between the generated video signal and the one or more generated audio signals. The content stream processor 1020 may include and utilize one or more of a central processing unit (CPU), a graphics processing unit (GPU), and a digital signal processing unit (DPU) in order to perform the processing.

The audio/video output interface 1040 includes the necessary signal conversion and processing, along with a physical connection interface, to provide audio and video signals to external audio and video devices. Examples of external audio and video devices include, but are not limited to, audio headphones, video displays, A/V receivers, powered audio speakers, and televisions. The audio/video output interface may include circuitry and connections for one or more standard audio/video connection protocols, such as high definition multimedia interface (HDMI), left-right audio analog audio, S/PDIF, red-green-blue (RGB) component video, separate video (S-video), digital visual interface (DVI), video graphics array (VGA), mobile high-definition ink (MHL), and composite video.

The memory 1030 includes one or more of a combination of RAM, flash memory, and ROM. The memory 1030 may be used for storage of operational code, applications, programs, buffered media, user media, user preference data, executable computer code, and software keys. Additional memory may be utilized through the data interface 1060. The data interface 1060 may provide a physical interface to various external portable memory devices including, but not limited to, a magnetic hard disk, an optical disk drive, a universal serial bus (USB) drive or memory device, a secure digital (SD) memory card, and the like. These external memories may be used to provide external user data, applications, software keys, and the like.

The controller 1050 provides signal routing and device management functions for the media content receiving device 1000. The controller 1050 may manage memory operations as well as interfacing to external memory devices through data interface 1060. The controller 1050 also processes any user commands provided through the user interface 1070. In one embodiment, a user command may include commands to access a new or different media content stream over the network. Controller 1050 generates the necessary data signal to execute the user command and provides the data signal through content stream processor 1020 to network interface 1010 for delivery to the content distributor or uniform resource locator (URL) having or containing the requested media content stream. Other user commands are also possible. Controller 1060 may be a general purpose microprocessor or similar processing circuit or device that is programmable with software instructions from memory 1030.

It is worth noting that content stream processor 1020 and controller 1050 may be combined into one element. Additionally, either the content stream processor 1020, the controller 1050, or the combined element may be configured completely as a special purpose programmable processor having software instructions stored in memory 1030 or provided from external memory through data interface 1060. Further, any possible combination of hardware and/or software implemented elements may also be used.

The user interface 1070 enables an input device to interface with the media content receiving device 1000. In one embodiment, the user interface 1070 is configured to communicate with a remote control device through a wireless interface such as Bluetooth (BT), radio frequency (RF), and infrared (IR) communication protocol. In one embodiment, the user interface 1070 supports the functionality through an input device, such as a remote control device or display touch screen including any combination of virtual buttons embodied on a customization screen, physical buttons, accelerometer, gyroscope, pressure sensor, tilt sensor, magnetic sensor, microphone, and light sensor.

In some embodiments, the network interface 1010 receives a media content stream from a content delivery network, such as a media distribution network or the internet, based on a request from a user made through user interface 1070. The delivered media content stream may include a video portion as well as an audio portion. The audio portion may include one or more audio signals that contain the main or primary audio content as well as additional audio content.

In some embodiments, the additional audio content may include an audio description signal. The audio description signal may be provided as part of an audio signal containing both the main or primary audio content as well as the scene and context description content contained in an audio description signal. Alternatively, the audio description signal may include only the scene and context content and rely on the presence of the main or primary audio signal as part of the audio playback mechanism. In some instances, the content stream processor 1020, based on a user request to listen to the audio description signal associated with the requested video content, may be configured to mix or combine the scene and content description content with the main audio content before delivering the audio signal to the audio/video output interface 1040. In other instances, the media content receiving device 1000 serves as a secondary receiver that receives the media content stream and provides only the audio description signal to the audio/video output interface 1040 based on the request from the user. The user relies on another primary audio reproduction device to provide the main audio content.

A user (e.g., a blind or low vision user) may select the use of audio description as a user entry on user interface 1070. Based on the user request, the controller sends a command to access the audio description content and replace, or mix, the main audio content with the audio description content and provide this signal to audio/video output interface 1040. In some embodiments, such as when the audio description content is not automatically included in the audio content portion of the media content stream, the controller may generate a request to include a stream with audio description content with the main audio content, in place of only the main audio content in the media content stream. The request is transmitted to the media content distributor or provider through the network interface 1010.

In some embodiments, an indication of the availability of audio description content associated with the media content stream may be present in the main audio signal. The presence of the indication may be heard and recognized by a user (e.g., a blind or low vision user). The user may make a request through the user interface 1070 to reproduce audio description content in place of, or in addition to, the main audio content as described above.

In some embodiments, the content stream processor 1020 may identify the indication that audio description content or an audio description signal associated with the media content stream is available. Based on the identification, the content stream processor 1020 may communicate with the controller 1050 to capture or record and store the indication in memory 1030. The controller 1050 may periodically communicate with the content stream processor to retrieve the indicator and include the indicator as an audio signal along with the audio and video signals through audio/video output interface 1040 for the user based on user preferences.

It is with noting that, in some embodiments, delivery and associated signal reception mechanisms similar to those described above in FIGS. 9 and 10, may also be employed for providing audio content including an audio soundtrack representing an audible form of written text and/or an audible description of a visual element. For example, a signal reception device, such as that described above in FIG. 10, may be used for receiving and/or playing back an audible reading of text or script, such as an audiobook, audio magazine, audio newspaper, or a specialized audio podcast. Additionally, a standalone playback device, such as a portable audio content player, may be used for listening to the audible reading of text or script. Further, a signal reception device or audio playback device may be used, in a manner similar to that described for audio description receiver 965 in FIG. 9, in a facility containing visual content, such as a museum, and providing audible descriptions of the visual content to the signal reception device or audio playback device.

Figure 11:
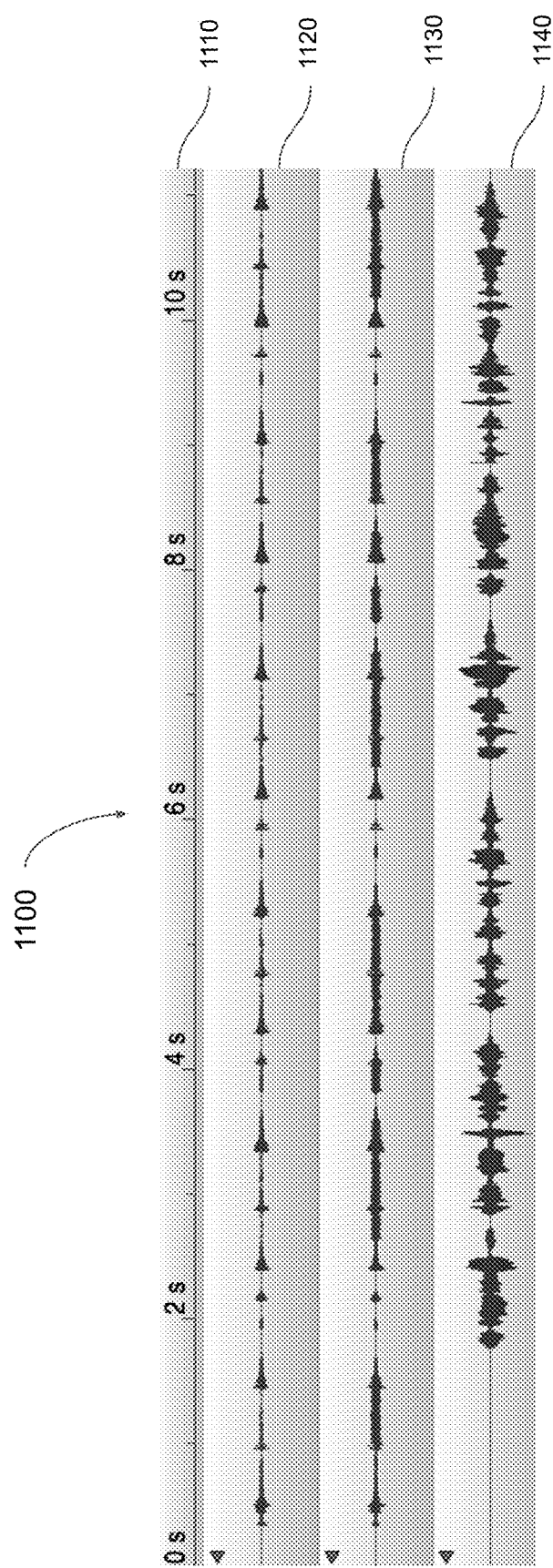
FIG. 11 is a further exemplary user interface including a display of signal waveforms for a set of audio soundtracks associated with media content to which principles of the present disclosure are applicable.

FIG. 11 shows a further exemplary user interface 1100 including a display of signal waveforms for a set of audio soundtracks associated with media content according to aspects of the present disclosure. The set of audio soundtracks represent the media content associated with the generation of an audiobook based on a reading or otherwise verbalization of the text of a book. The user interface 1100 may be generated using program instructions as part of an audio processing software package, such as Pro Tools®. The software package may be used in, or included as part of, an audio content processing device, such as audio workstation 200 described in FIG. 2 or audio content processing device described in FIG. 2. The user interface 1100 may be displayed on a display incorporated into a user interface, such as user interface 290 in FIG. 2, or may be displayed on a separate display device (e.g., a tablet computer, a laptop computer) through a display or network connection from the audio content processing device. The user interface 300 may be used in conjunction with content manipulation controls included in one or more menus accessible by a user (e.g., production or audio engineer) through a user interface (e.g., user interface 290 in FIG. 2). The menus may include selection entries for ingesting data, representing one or more of the set of audio soundtracks, into the software as well as separating and displaying signal waveforms, as part of user interface 1100, representing one or more of the soundtracks. The menus may also include selection entries for processing and mixing one or more of the set of the audio soundtracks as well as repackaging the processed set of audio soundtracks for use with a media content package as described above.

The user interface 1100 includes a top horizontal axis representing a time axis 310. The time axis 1110 may be scalable under user control to display the signal waveform for an entire soundtrack or set of soundtracks, or only a portion. Although not shown, a vertical axis may also be included to represent signal level or amplitude for the displayed signal waveforms. In some embodiments, movable coordinate markers for each signal waveform may also be included to display the amplitude of one or more signal waveforms at a particular time position along the time axis 1110. As shown, user interface 1100 is displaying the signal waveforms representing the initial portion of a set of audio soundtracks covering approximately eleven (11) seconds in length.

The user interface 1100 also displays a first signal waveform 1120 representing a portion of a first audio soundtrack and a second signal waveform 1130 representing a portion of a second audio soundtrack that are included in the set of audio soundtracks associated with a media content package. The first signal waveform 1120 and second signal waveform 1130 represent left and right stereo background audio soundtracks associated with the audiobook. The left audio soundtrack may include music or other sound effects used as part of the background content for the audiobook. The user interface 300 may display more or fewer signal waveforms representing additional audio soundtracks depending on requirements and preferences of the user (e.g., production or audio engineer). Additionally, other and/or different audio soundtracks may be included as part of the set of audio soundtracks as described earlier.

User interface 1100 also displays a signal waveform 1140. Signal waveform 1140 represents the audio soundtrack representing the reading or verbalizing of the written text of the book. As such, the audio soundtrack includes all of the audible content representing the written text, including the dialog between character, the written narration, and any associated description of the characters, locations, etc. from the written text. Such an audio soundtrack may be referred to as an aural soundtrack. The signal waveform 1140 representing the aural soundtrack may be provided as part of the media content package as described above, or may be generated, either locally or remotely, and ingested into the software package through the audio content processing device (e.g., audio workstation 200 in FIG. 2) separate from the media content package. The aural soundtrack may be generated using one or both of human generation (i.e., human speech) and computer generation (i.e., computer speech) and control. The audio signal for the aural soundtrack in signal waveform 1140 may be generated using one or both of a recorded human voice or computer synthesis. A quality level for signal waveform 1140 may be identified and/or determined based on waveform content analysis using an analysis script created within the software package (e.g., Pro Tools®) or may be identified and/or determined using metadata or other similar data provided electronically or physically with the audio soundtrack. The identification of the quality level of the audio soundtrack as part of user interface 1100 may be included as part of determining the quality level from a set of quality levels for the audio soundtrack, in a manner similar to that described for the audio description soundtrack above.

It is worth noting that in some embodiments, one or both of signal waveforms 1120 and 1130 may include diegetic as well as non-diegetic sound. Diegetic sound is any sound that is intended to emanate from the story (i.e., associated with the written text) whereas non-diegetic sound is any sound that is not intended to emanate from the story and is provided only for the user to hear (e.g., the music or similar content described above). One or both of the signal waveforms 1120 and 1130 may further include trans-diegetic sound, or sound that includes both a diegetic portion and a non-diegetic portion. Trans-diegetic sound may be used to help bridge or link two aspects of a story, such as a change of scenery or the start of a new chapter or section.

Figure 12:
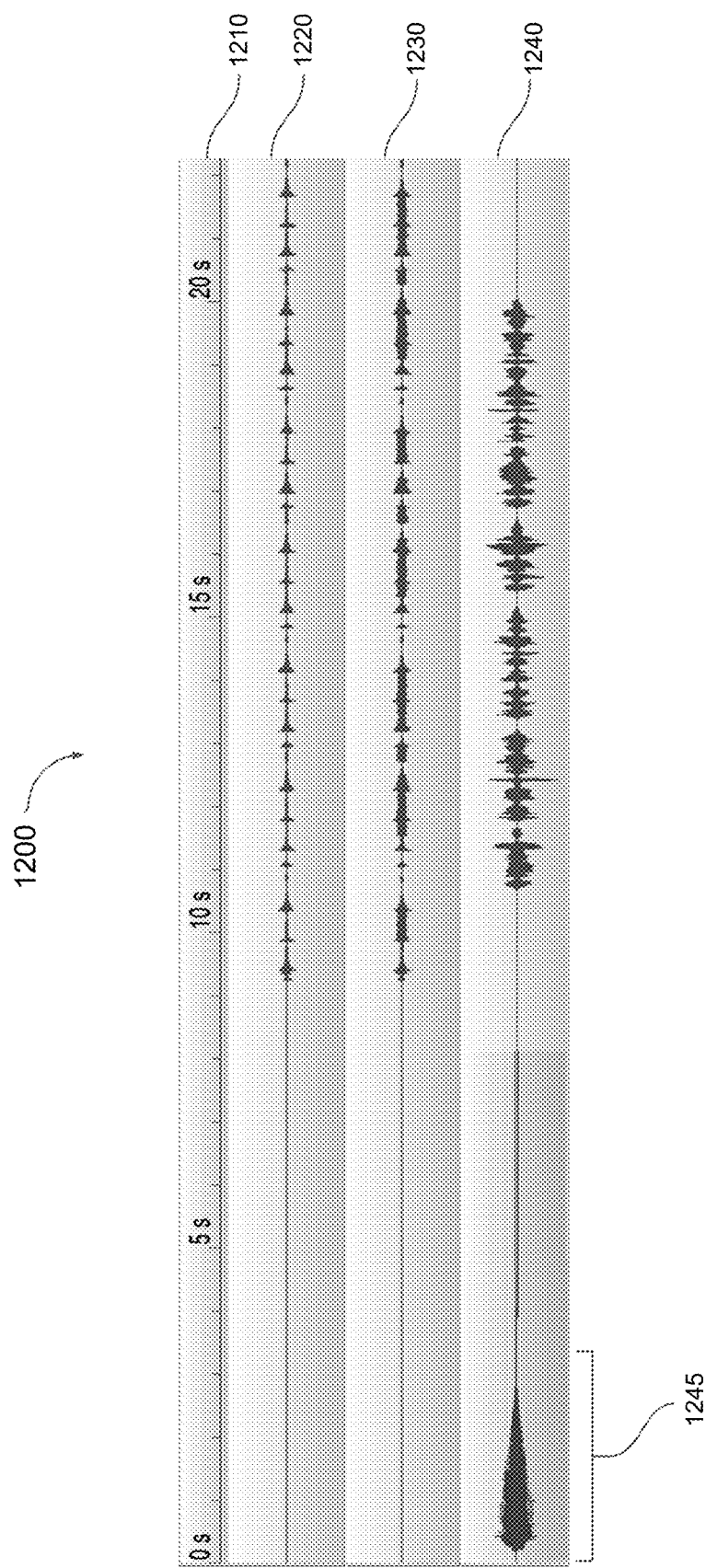
FIG. 12 is yet another exemplary user interface including a display of signal waveforms for a set of audio soundtracks associated with media content to which principles of the present disclosure are applicable.

FIG. 12 shows yet another exemplary user interface 1200 including a display of waveform signals for a set of audio soundtracks associated with media content according to aspects of the present disclosure. The set of audio soundtracks represent the media content associated with the generation of an audiobook based on a reading or otherwise verbalization of the text of the same book as described in FIG. 11. The user interface 1200 may be generated and used in the same manner as described for user interface 1100 in FIG. 11. Further, except as described here in FIG. 12, the operation and display of elements 1210, 1220, 1230, and 1240 will be the same as described for elements 1110, 1120, 1130, and 1140 for user interface 1100.

In user interface 1200, time axis 1210 has been adjusted to display the initial twenty two (22) seconds of the signal waveforms 1220, 1230, and 1240 representing the same audio soundtracks as described in FIG. 3. User interface 1200 also displays a signal waveform 1435 representing the indication of quality level for the aural soundtrack associated with the media content package, as described above. The indication of quality level may be a tone or a short audio passage. The signal waveform 1245 is shown inserted at or near the beginning of the audio content lasting approximately three (3) seconds. Although the signal waveforms 1220 and 1230 do not include signal waveform 1245, in some embodiments signal waveform 1245 may be included in one or both.

It is worth noting that the signal waveform 1245 representing the audio content for the indication of quality level may be inserted manually or electronically into the signal waveform 1240 for the oral soundtrack, as well as other signal waveforms (e.g., signal waveforms 1220 and 1230) using the audio software package (e.g., Pro Tools®) in a manner similar to that described above. The length of time associated with the insertion of signal waveform 1245 must also be accounted for, or included in, all other audio soundtracks that do not include the signal waveform 1245. The added audio content may generally be represented as no signal and displayed in user interface 1200 in order to maintain synchronization of the set of audio soundtracks as described above. The starting time for signal waveforms 1210, 1220, and 1230 are shown extended to start after around nine (9) seconds as opposed to starting closer to one (1) second in FIG. 11. Further, signal waveform 1245 may be included at other points in time of signal waveform 1240, as well as signal waveforms 1220 and 1230, either as an insertion or as a replacement section of the signal waveform as described above. As such, signal waveform 1240 represents a modified aural soundtrack, with the original or received aural soundtrack associated with the media content package displayed in a user interface, similar to user interface 1200, individually or as combined with the signal waveforms 1220 and 1230.

The signal waveforms 1220, 1230, and 1240 representing the left and right stereo background audio soundtracks and the modified aural soundtrack may be combined or mixed to form part of a media content package. The media content may be included with other media content for delivery over a communication network. The communication network may be a private communication such as a wireless network at a facility, or may be a public network network, such as the internet, using a media content provider, as described above. Further, the signal waveform 1240 and, in some cases, signal waveforms 1220 and 1230 may be packaged together with other media content and provided to users in the form of physical media, such as an optical disk, a portable flash memory device, and the like, through a written content producer, physical media content producer, or large retail business.

It is worth noting although the user interfaces 1100 and 1200 are described with respect to a set of audio soundtracks representing the media content associated with the generation of an audiobook, user interfaces 1100 and 1200 may equally apply to the audio soundtracks representing the audible form of other printed text, such as magazines, newspapers, and the like. The user interfaces 1100 and 1200 may also equally apply to the soundtracks representing the audible description of a visual element, such as a picture book, a photograph, a painting, or a sculpture. Further, user interfaces 1100 and 1200 may equally apply to the soundtracks representing both the audible of printed text as well as the audible description of a visual element, such as in children's books, comic books, graphic novels, and the like.

Figure 13:
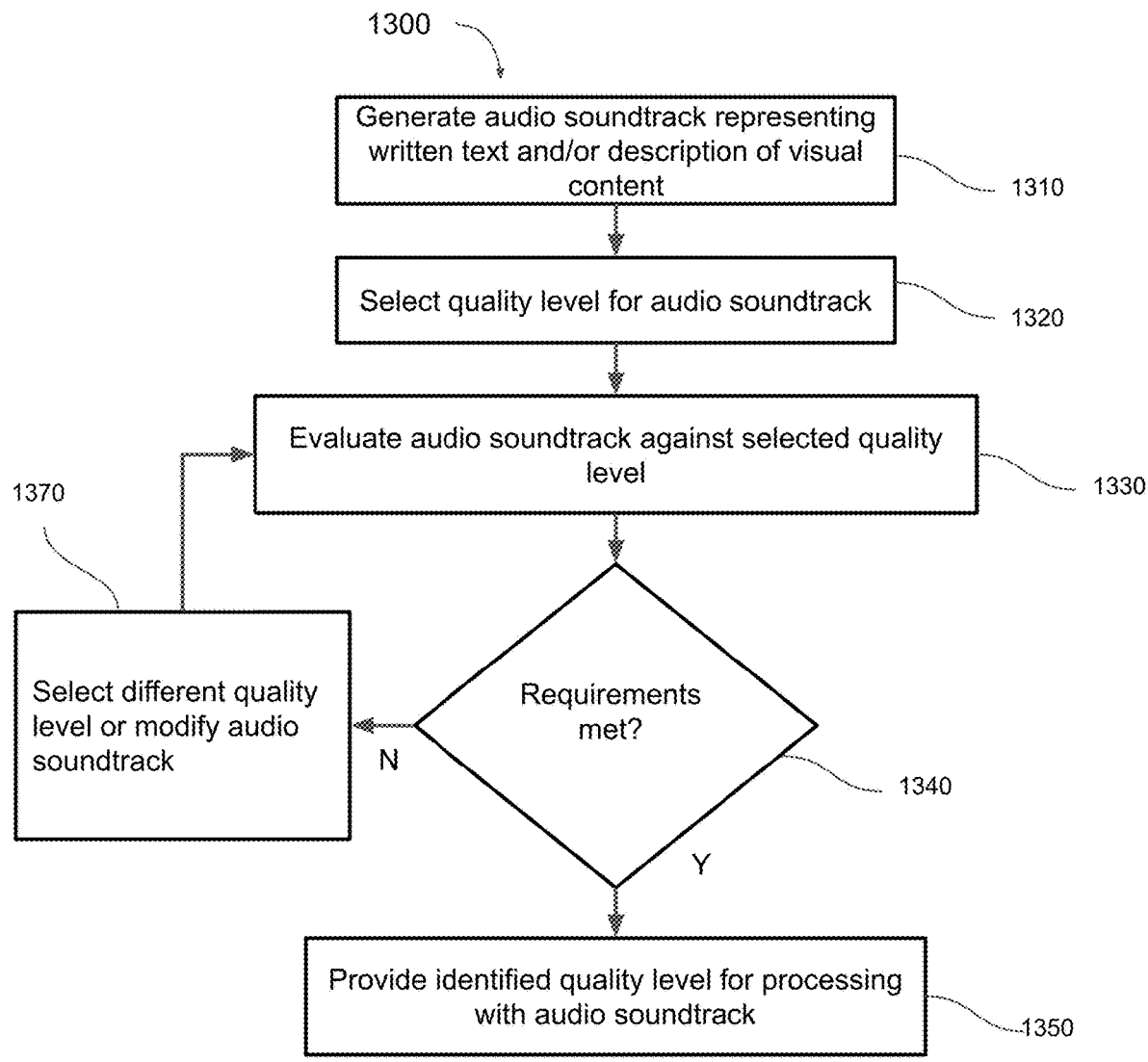
FIG. 13 is a flow chart for an exemplary process for identifying the quality level for an audio soundtrack representing one or both of an audible form of written text and an audible description of a visual element for use in media content to which principles of the present disclosure are applicable.

FIG. 13 shows a flow chart for an exemplary process 1300 for identifying the quality level for an aural soundtrack for use in media content according to principles of the present embodiments. Process 1300 is primarily described with respect to an audio processing device, such as audio workstation 200 in FIG. 2. Process 1300 may also be performed by one or more devices that operate within a post-production system, such as media content processing device 120 and audio content processing device 140 in FIG. 1. It is worth noting that such a device may include a computing device, such as a microprocessor or a server device, and one or more memories for storing operating code implementing one or more elements of process 1300 described herein. Although process 1300 describes steps performed in a particular order for purposes of illustration and discussion, the operations discussed herein are not limited to any particular order or arrangement. One skilled in the art, using the disclosure provided herein, will also appreciate that one or more of the steps of process 1300 may be omitted, rearranged, combined, and/or adapted in various ways.

At step 1310, audio content representing written text and/or description of visual content. is generated and formed into an aural soundtrack, similar to that described above. The audio content may be generated or formed in order to be included along with a set of supporting audio soundtracks associated with media content. The audio content for the aural soundtrack may be generated locally (e.g., at a post-production facility using audio capture device 150 and/or audio content processing device 140 in FIG. 1) or may be generated at a different location or facility and provided for processing in a post-production system in a manner similar to that described above.

At step 1320, a level of quality is selected as part of the evaluation of the generated aural soundtrack. The level of quality may be selected by a user (e.g., a production or audio engineer) from one of a set of quality levels or quality tiers through a user interface (e.g., user interface 290) and entered memory (e.g. memory 280) in the audio workstation. For example, the set of quality levels may include four quality levels ranging from machine or computer scripted and machine or computer generated scene and context description content to human generated scripting and professional human read scene and context description content.

At step 1330, the aural soundtrack is evaluated against one or more criteria elements, similar to the criteria elements described above, for the selected quality level similar to some of the criteria described above. The criteria may be based on objective requirements or conditions using information associated with aural soundtrack, such as metadata included with the aural soundtrack and tonality or other measurable audio characteristics of the aural soundtrack. The criteria may further be based on more subjective requirements or conditions, such as delivery effectiveness of the written text used to generate the audio content. Further, each quality level or tier may have varying criteria and may have a different mix of objective and subjective criteria. For example, evaluation of the criteria for the machine or computer scripted and machine or computer generated may be completely objective and evaluated using hardware and/or software included in either an audio workstation (e.g., audio workstation 200 in FIG. 2)) or one or more components or devices in a post-production facility (e.g., post-production facility 100 in FIG. 1).

At step 1340, a determination is made as to whether the requirements associated with the selected quality level with respect to the aural soundtrack, at step 730, have been met. In some embodiments, the determination may include a determination that a threshold number of requirements met or a threshold value score from the requirements have been exceeded. The threshold number of requirements or threshold value may be predetermined or specified based on an established set of minimum requirements or standards for the content of the aural soundtrack at the specified or selected level. In some embodiments, some or all of the determination, at step 1340, may be performed using audio processing in an audio processing circuit (e.g., soundtrack processor 230).

If, at step 1340, it is determined that the audio description soundtrack at least meets the requirements, then, at step 1350, an indication of the quality level of the content of the aural soundtrack is provided for further processing with the aural soundtrack, such as in an audio workstation (e.g., soundtrack processor 230 and soundtrack mixer 240). In some embodiments, the indication of the quality level may be inserted into the aural soundtrack as well one or more of the audio soundtracks that are associated with the aural soundtrack as described above.

If, at step 1340, it is determined that the audio description soundtrack does not meet the requirements, then, at step 1370, a different quality level may be selected or the aural soundtrack received or generated, at step 1310, may be modified. In some embodiments, a message may be provided on a display as part of a user interface (e.g. user interface 290) notifying the user (e.g., production or audio engineer) that the audio description soundtrack did not meet the requirements for the selected quality level. Process 1300 then returns back to step 1330 where either the generated aural soundtrack is re-evaluated using a newly selected quality level or the newly modified aural soundtrack is re-evaluated using the originally selected quality level.

Figure 14:
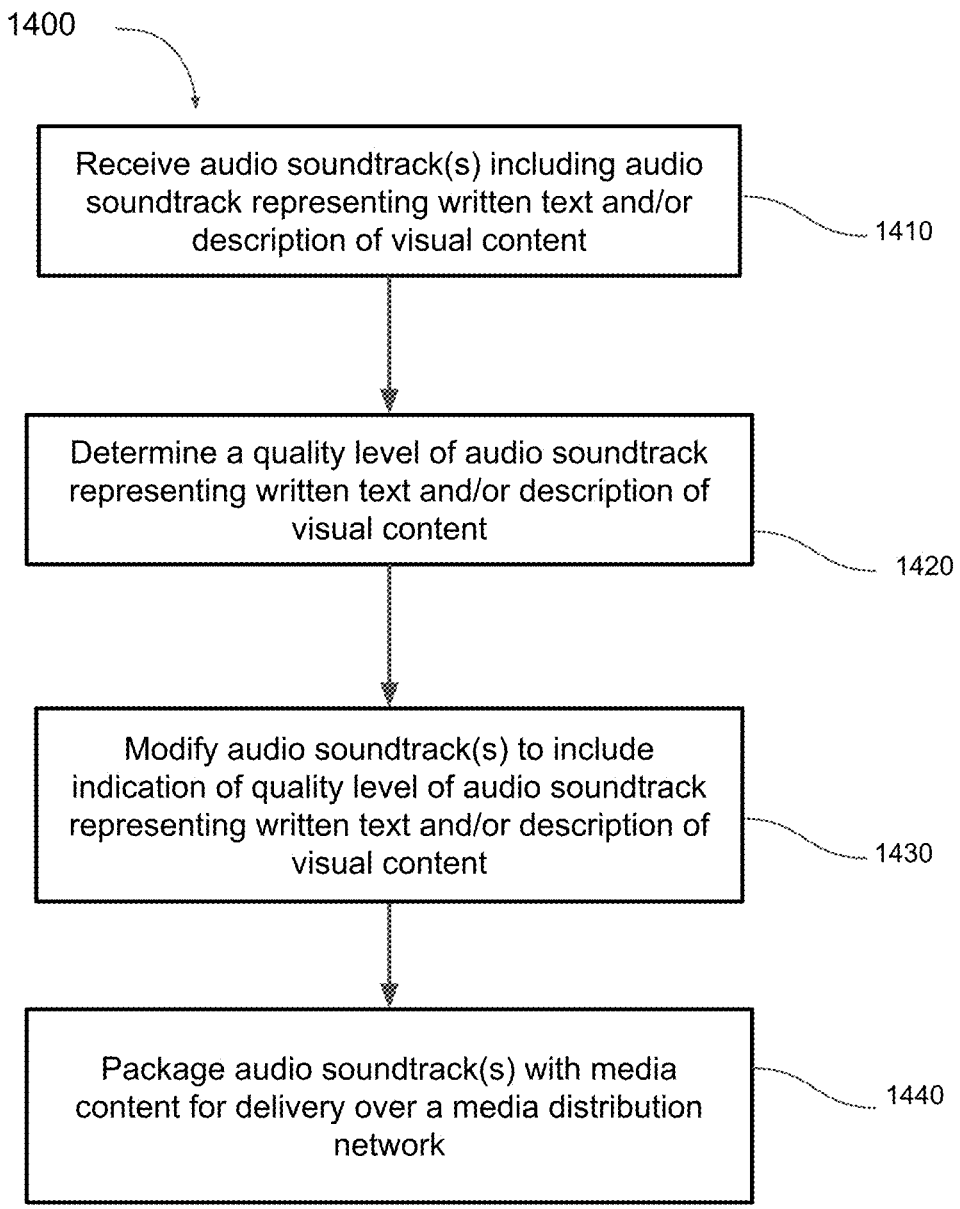
FIG. 14 is a flow chart for an exemplary process for providing an indication of the quality level of an audio soundtrack representing one or both of an audible form of written text and an audible description of a visual element used in media content to which principles of the present disclosure are applicable.

FIG. 14 shows a flow chart for an exemplary process 1400 for providing an indication of the quality level of an aural soundtrack used in media content according to principles of the present disclosure. Process 1400 is primarily described with respect to an audio processing device, such as audio workstation 200 in FIG. 2. Process 1400 may also be performed by one or more devices that operate within a post-production system, such as media content processing device 120 and audio content processing device 140 in FIG. 1. It is worth noting that such devices may include a computing device, such as a microprocessor or a server device, and one or more memories for storing operating code implementing one or more elements of process 800 described herein. Although process 1400 describes steps performed in a particular order for purposes of illustration and discussion, the operations discussed herein are not limited to any particular order or arrangement. One skilled in the art, using the disclosure provided herein, will also appreciate that one or more of the steps of process 1400 may be omitted, rearranged, combined, and/or adapted in various ways.

At step 1410, a set of audio soundtracks, including an audio soundtrack representing written text and/or a description of visual content (i.e. an aural soundtrack), associated with media content is received at an audio workstation (e.g., audio content interface 210 in FIG. 2).

At step 1420, the quality level of the aural soundtrack may be determined. The quality level may be determined, at step 1420, using a process similar to that described above as part of FIG. 13. In some embodiments, only a single quality level may be present and used for a single evaluation and identification. In some embodiments, more than one quality level or tier may be established for the aural soundtrack based on sets of different criteria, such as those described above. In one embodiment, at least one of the quality levels is a level identifying that the content included in the aural soundtrack is computer generated. In embodiments that involve computer generated content representing written text or description of visual content in the aural soundtrack, audio analysis tools available in an audio signal processor (e.g., soundtrack processor 230) may be used to determine the quality level, at step 820. In some embodiments, metadata included with aural soundtrack or other external information regarding the aural soundtrack may be processed, including electronically (e.g., in soundtrack processor 230), to determine the quality level.

At step 1430, one or more of the audio soundtracks, including the aural soundtrack, associated with the media content are modified to include an indication of quality level for the aural soundtrack. The modification, at step 1430, may be performed using an audio signal mixer (e.g., soundtrack mixer 240) and/or audio signal processor (e.g., soundtrack processor 230). The modification, at step 1430, may include inserting the indication of quality level into the aural soundtrack as well one or more of the main audio soundtracks using soundtrack processor 230. As described above, the indication of quality level may be a short sound similar to the indication of availability described above and may be inserted at the beginning of the audio soundtracks as well as at other strategic times within the audio soundtracks. In some embodiments, each quality level has a different indication of quality level. For instance, each quality level uses the same base set of audio tones, but the amount of orchestration based on added audio tones is raised as the quality level is raised. In some embodiments, at step 1430, the set of audio soundtracks may also be repackaged (e.g., in soundtrack packager 270) to produce a final processed set of audio soundtracks associated with the media content.

At step 1440, the set of audio soundtracks, including any modified audio soundtracks, are packaged with any other portions of the media content package in a media content processing device (e.g., media content processing device 120 in FIG. 1). The packaged media content is further provided to content distributors through a secure communication device (e.g., secure network device 110 in FIG. 1) for delivery over a media distribution network to the public for use as entertainment. The media distribution network may include a wired or wireless communication network as well as a physical packaged media manufacturing, distribution, and sales network as described above. In some embodiments, at step 1440, the packaged media content may be additionally or alternatively provided to media servers used by content producers. The content producers may distribute or release the media content for sale to the public or for use in a live presentation.

It is worth noting that, as has been indicated above, all or parts of one or more of the processes 1300 and 1400 may be used in combination. Further, parts of one or more of the processes 1300 and/or 1400 may be used in combination with some or all of processes 600, 700, and/or 800. Such combinations are intentional as well as expected and should not be considered outside the scope of the embodiments of the present disclosure.

Although embodiments which incorporate the teachings of the present disclosure have been shown and described in detail herein, those skilled in the art can readily devise many other varied embodiments that still incorporate these teachings. Having described preferred embodiments of a method and apparatus for providing audio description content, it is noted that modifications and variations can be made by persons skilled in the art in light of the above teachings. It is therefore to be understood that changes may be made in the particular embodiments of the disclosure disclosed which are within the scope of the disclosure.

The invention claimed is:

1. A method comprising:
receiving at least one audio soundtrack associated with media content, the at least one audio soundtrack including an audio soundtrack representing at least one of an audible form of written text, an audible description of a visual element, and an audible narration or description associated with visual content;
determining a quality level of the audio soundtrack representing at least one of an audible form of written text, an audible description of a visual element, and an audible narration or desc on associated with visual content; and
modifying the audio soundtrack representing at least one of an audible form of written text, an audible description of a visual element, and an audible narration or description associated with visual content to include an indication of the quality level based on the determination.

2. The method of claim 1, wherein the visual element is at least one of a picture, a photograph, a sculpture, and a picture book.

3. The method of claim 1, wherein the written text is from at least one of a book, a magazine, and a newspaper.

4. The method of claim 1, wherein the audible form of written text includes at least one of dialog between characters, narration, and scene and context description.

5. The method of claim 1, wherein the modifying further includes inserting the indication of the quality level at the beginning of the audio soundtrack representing at least one of an audible form of written text, and an audible description of a visual element, and an audible narration or description associated with visual content.

6. The method of claim 1, wherein the indication of the quality level is a sound lasting for a period of time.

7. The method of claim 1, wherein the quality level is one of a set of quality levels for the audio soundtrack representing at least one of an audible form of written text, an audible description of a visual element, and an audible narration or description associated with visual content.

8. The method of claim 7, wherein the set of quality levels includes at least one quality level associated with identifying the at least one of an audible form of written text and an audible description of a visual element as being computer generated.

9. The method of claim 1, wherein the at least one audio soundtrack is a set of audio soundtracks, the method further comprising combining the modified audio soundtrack and at least one of the set of audio soundtracks to produce a modified set of audio soundtracks for delivery as the media content over a communication network.

10. The method of claim 1, further comprising packaging the modified audio soundtrack with the media content for delivery in the form of a physical media to users.

11. An apparatus comprising:
a memory circuit that stores at least one audio soundtrack associated with media content, the at least one audio soundtrack including an audio soundtrack representing at least one of an audible form of written text, an audible description of a visual element, and an audible narration or description associated with visual content; and
an audio processing circuit coupled to the memory circuit, the audio processing circuit configured to retrieve the at least one audio soundtrack and determine a quality level of the audio soundtrack representing at least one of an audible form of written text, an audible description of a visual element, and an audible narration or description associated with visual content, the audio processing circuit further configured to modify the audio soundtrack representing at least one of an audible form of written text, an audible description of a visual element, and an audible narration or description associated with visual content to include an indication of the quality level based on the determination.

12. The apparatus of claim 11, wherein the visual element is at least one of a picture, a photograph, and a picture book.

13. The apparatus of claim 11, wherein the written text is from at least one of a book, a magazine, and a newspaper.

14. The apparatus of claim 11, wherein the audio soundtrack representing at least one of an audible form of written text, an audible description of a visual element, and an audible narration or description associated with visual content includes at least one of dialog between characters, narration, and visual description.

15. The apparatus of claim 11, wherein the audio processing circuit is further configured to insert the indication of the quality level at the beginning of the audio soundtrack representing at least one of an audible form of written text, an audible description of a visual element, and an audible narration or description associated with visual content.

16. The apparatus of claim 11, wherein the quality level is one of a set of quality levels for the audio soundtrack representing at least one of an audible form of written text, a audible description of a visual element, and an audible narration or description associated with visual content.

17. The apparatus of claim 11, wherein the audio processing circuit is further configured to package the modified audio soundtrack into the media content for delivery in the form of a physical media to users.

18. A non-transitory computer readable medium carrying instructions in the form of program code that, when executed on one or more processors:
receives at least one audio soundtrack associated with media content, the at least one audio soundtrack including an audio soundtrack representing at least one of an audible form of written text, an audible description of a visual element, and an audible narration or description associated with visual content;
determines a quality level of the audio soundtrack; and
modifies the audio soundtrack representing at least one of an audible form of written text, an audible description of a visual element, and an audible narration or description associated with visual content to include an indication of the quality level based on the determination.

19. The non-transitory computer readable medium of claim 18, wherein the quality level is one of a set of quality levels for the audio soundtrack representing at least one of an audible form of written text, an audible description of a visual element, and an audible narration or description associate with visual content and wherein the set of quality levels includes at least one first quality level associated with identifying the at least one of an audible form of written text, an audible description of a visual element, and an audible narration or description associated with visual content as being generated by at least one of an audiobook narrator or voice over artist.

20. The non-transitory computer readable medium of claim 19, wherein the set of quality levels includes at least one second quality level associated with identifying the at least one of an audible form of written text, an audible description of a visual element, and an audible narration or description associated with visual content as being synthetically generated using at least one of voice doubling, voice cloning, and composite voice synthesis.

\* \* \* \* \*